US009155422B1

(12) United States Patent
Wohld

(10) Patent No.: US 9,155,422 B1
(45) Date of Patent: Oct. 13, 2015

(54) TURKEY FLIPPER AND METHOD FOR MAKING AND USING

(76) Inventor: Susan M. Wohld, Downers Grove, IL (US)

( * ) Notice: Subject to any disclaimer, the term of this patent is extended or adjusted under 35 U.S.C. 154(b) by 1438 days.

(21) Appl. No.: 12/565,556

(22) Filed: Sep. 23, 2009

Related U.S. Application Data

(60) Provisional application No. 61/099,742, filed on Sep. 24, 2008.

(51) Int. Cl.
*A22C 7/00* (2006.01)
*A23P 1/00* (2006.01)
*A47J 43/18* (2006.01)
*A47J 37/04* (2006.01)

(52) U.S. Cl.
CPC .............. *A47J 43/18* (2013.01); *A47J 37/041* (2013.01)

(58) Field of Classification Search
CPC ......... A47J 37/041; A47J 43/18; A47J 37/01; A47J 37/049; A47J 37/04; F24C 15/16
USPC ............ 99/427, 349–351, 421 R, 421 H, 426, 99/448–450
See application file for complete search history.

(56) References Cited

U.S. PATENT DOCUMENTS

| | | | | |
|---|---|---|---|---|
| 504,256 A * | 8/1893 | Strong | ............................. | 99/345 |
| 534,255 A * | 2/1895 | Fleming | .......................... | 99/340 |
| 553,363 A * | 1/1896 | Sickels | ........................... | 99/427 |
| 847,147 A * | 3/1907 | Arthur | ....................... | 198/803.2 |
| 1,162,859 A * | 12/1915 | Guillot | .......................... | 366/234 |
| 1,187,875 A * | 6/1916 | Welty | ................................. | 220/6 |
| 1,263,863 A * | 4/1918 | Crosby | .......................... | 99/449 |
| 1,423,715 A * | 7/1922 | Hedberg | ............................ | 43/61 |
| 1,499,665 A * | 7/1924 | Kaufman | ...................... | 220/485 |
| 1,550,138 A * | 8/1925 | Baker | ............................. | 99/426 |
| 2,102,097 A * | 12/1937 | Sherman | ......................... | 99/390 |
| 2,214,137 A * | 9/1940 | Urth et al. | ....................... | 99/426 |
| 2,216,457 A * | 10/1940 | Salisbury | .................... | 99/443 R |
| 2,222,089 A * | 11/1940 | Saffell | ............................. | 99/426 |
| 2,360,026 A * | 10/1944 | Wall | ............................... | 99/426 |
| 2,367,448 A * | 1/1945 | Thiele | ............................ | 99/409 |
| 2,456,419 A * | 12/1948 | Jackson et al. | ..................... | 220/6 |
| 2,467,411 A * | 4/1949 | Tingdale | ......................... | 40/308 |
| 2,530,148 A * | 11/1950 | Bjorklund et al. | ............ | 119/474 |
| 2,575,149 A * | 11/1951 | Watson | ........................ | 220/4.21 |
| 2,632,578 A * | 3/1953 | Brickman | .............................. | 220/6 |
| 2,693,786 A * | 11/1954 | Babros et al. | ................. | 119/459 |
| 2,735,358 A * | 2/1956 | Gilbert | ............................ | 99/427 |
| 2,760,428 A * | 8/1956 | Boyajian | ......................... | 99/427 |
| 2,772,627 A * | 12/1956 | Newell | ............................ | 99/425 |
| 2,814,982 A * | 12/1957 | Labin | ............................. | 99/427 |

(Continued)

*Primary Examiner* — Eric Stapleton
(74) *Attorney, Agent, or Firm* — Charles A. Lemaire; Jonathan M. Rixen; Lemaire Patent Law Firm, P.L.L.C.

(57) ABSTRACT

An apparatus that includes a breast rack to accommodate a breast side of a bird and a back rack to accommodate a back side of the bird is provided. In some embodiments, the breast rack includes breast-rack handles at each end of the breast rack that extend in an upward direction from the breast rack, and each breast-rack handle can include an attaching mechanism. In some embodiments, the back rack includes back-rack handles at each end of the back rack that extend in an upward direction from the back rack. In some embodiments, each back-rack handle includes a plurality of receiving mechanisms located at a plurality of different positions for receiving the attaching mechanism of the breast-rack handles.

12 Claims, 14 Drawing Sheets

(56) References Cited

U.S. PATENT DOCUMENTS

| | | | | |
|---|---|---|---|---|
| 2,827,847 | A * | 3/1958 | Shafter | 99/402 |
| 2,839,989 | A * | 6/1958 | Persinger | 99/421 R |
| 2,846,941 | A * | 8/1958 | Goodwin | 99/340 |
| 2,846,942 | A * | 8/1958 | Bowman | 99/427 |
| 2,853,193 | A * | 9/1958 | Crumb | 210/328 |
| 2,882,812 | A * | 4/1959 | Greenwald | 99/427 |
| 2,883,924 | A * | 4/1959 | Koser | 99/427 |
| 2,892,562 | A * | 6/1959 | Smithson | 220/7 |
| 2,895,408 | A * | 7/1959 | Glenny | 99/427 |
| 2,938,450 | A * | 5/1960 | Carpenter et al. | 99/427 |
| 3,040,650 | A * | 6/1962 | Watts | 99/402 |
| 3,084,618 | A * | 4/1963 | Dieterich | 99/427 |
| 3,126,814 | A * | 3/1964 | Brown | 99/421 H |
| 3,132,950 | A * | 5/1964 | Christian et al. | 426/246 |
| 3,147,690 | A * | 9/1964 | Smith | 99/421 H |
| D199,712 | S * | 12/1964 | Elliott | D7/409 |
| 3,163,103 | A * | 12/1964 | Shoup | 99/427 |
| 3,181,453 | A * | 5/1965 | Moran | 99/349 |
| 3,188,939 | A * | 6/1965 | Smith | 99/393 |
| 3,220,335 | A * | 11/1965 | Rodrigue | 99/394 |
| 3,269,299 | A * | 8/1966 | Nielsen | 99/421 H |
| 3,359,889 | A * | 12/1967 | Young et al. | 99/426 |
| 3,372,636 | A * | 3/1968 | Marasco | 99/427 |
| 3,405,631 | A * | 10/1968 | Thomas, Jr. | 99/426 |
| 3,419,175 | A * | 12/1968 | Laughlin et al. | 220/486 |
| 3,536,000 | A * | 10/1970 | Whitehill | 99/425 |
| 3,550,558 | A * | 12/1970 | Sachs | 119/456 |
| 3,556,058 | A * | 1/1971 | Smiler | 119/474 |
| 3,566,776 | A * | 3/1971 | Young et al. | 99/426 |
| 3,585,922 | A * | 6/1971 | Peterson et al. | 99/355 |
| 3,593,689 | A * | 7/1971 | Van Huis | 119/474 |
| 3,646,879 | A * | 3/1972 | Palmason et al. | 99/339 |
| 3,665,843 | A * | 5/1972 | Moore | 99/419 |
| 3,677,172 | A * | 7/1972 | Wilson | 99/347 |
| 3,691,937 | A * | 9/1972 | Meek et al. | 99/340 |
| 3,784,149 | A * | 1/1974 | Stoffel | 294/149 |
| 3,788,209 | A * | 1/1974 | Artar et al. | 99/349 |
| 3,797,379 | A * | 3/1974 | Brion | 99/421 H |
| 3,839,050 | A * | 10/1974 | Gordon | 99/345 |
| 3,874,547 | A * | 4/1975 | Howard | 220/485 |
| 3,896,766 | A * | 7/1975 | Martin | 119/474 |
| 3,922,961 | A * | 12/1975 | Case | 99/427 |
| 3,934,728 | A * | 1/1976 | Guth | 211/41.9 |
| 3,935,958 | A * | 2/1976 | Frangos | 220/488 |
| 4,005,646 | A * | 2/1977 | Kruper | 99/427 |
| 4,052,934 | A * | 10/1977 | Shinman | 99/355 |
| 4,103,606 | A * | 8/1978 | Gitcho | 99/443 C |
| 4,140,889 | A * | 2/1979 | Mason et al. | 219/733 |
| 4,152,963 | A * | 5/1979 | Romanik et al. | 83/762 |
| 4,238,035 | A * | 12/1980 | Kassanchuk | 211/74 |
| 4,334,463 | A * | 6/1982 | Goldie | 99/426 |
| 4,338,912 | A * | 7/1982 | Gaskins | 126/25 A |
| 4,369,697 | A * | 1/1983 | Millington | 99/351 |
| 4,370,921 | A * | 2/1983 | Moller et al. | 99/405 |
| 4,382,432 | A * | 5/1983 | Lizdas | 126/25 A |
| 4,401,018 | A * | 8/1983 | Berry | 99/420 |
| 4,407,189 | A * | 10/1983 | Bentson | 99/421 HH |
| 4,442,762 | A * | 4/1984 | Beller | 99/427 |
| 4,442,763 | A * | 4/1984 | Beller | 99/427 |
| 4,483,241 | A * | 11/1984 | Vaughn | 99/421 H |
| 4,526,285 | A * | 7/1985 | Cerveny et al. | 220/7 |
| 4,559,869 | A * | 12/1985 | Hogan | 99/426 |
| 4,583,452 | A * | 4/1986 | Grosse | 99/427 |
| 4,688,477 | A * | 8/1987 | Waltman | 99/427 |
| 4,723,482 | A * | 2/1988 | Weiss et al. | 99/441 |
| 4,732,291 | A * | 3/1988 | McConnell | 220/488 |
| 4,741,262 | A * | 5/1988 | Moncrief | 99/449 |
| 4,744,292 | A * | 5/1988 | Nagata | 99/351 |
| 4,762,085 | A * | 8/1988 | Ondrasik | 119/474 |
| 4,763,606 | A * | 8/1988 | Ondrasik, II | 119/474 |
| 4,836,392 | A * | 6/1989 | Constantino | 211/133.5 |
| 4,839,186 | A * | 6/1989 | Boyle | 426/523 |
| D302,229 | S * | 7/1989 | Gilgore et al. | D7/409 |
| 4,848,217 | A * | 7/1989 | Koziol | 99/426 |
| D303,910 | S * | 10/1989 | Sjoberg | D7/409 |
| 4,917,047 | A * | 4/1990 | Wazeter, III | 119/474 |
| 5,010,848 | A * | 4/1991 | Rankin | 119/461 |
| 5,036,795 | A * | 8/1991 | Houghton | 119/452 |
| 5,158,009 | A * | 10/1992 | Stewart | 99/426 |
| 5,205,208 | A * | 4/1993 | Gongwer | 99/345 |
| D337,023 | S * | 7/1993 | Nielson et al. | D7/409 |
| 5,410,948 | A * | 5/1995 | Eickmeyer | 99/335 |
| D359,880 | S * | 7/1995 | Fielding et al. | D7/409 |
| 5,445,063 | A * | 8/1995 | Sherman | 99/421 H |
| 5,497,697 | A * | 3/1996 | Promny | 99/427 |
| 5,503,062 | A * | 4/1996 | Buff, IV | 99/426 |
| 5,544,619 | A * | 8/1996 | Braun | 119/474 |
| 5,549,073 | A * | 8/1996 | Askins et al. | 119/474 |
| 5,562,022 | A * | 10/1996 | Schmid et al. | 99/421 H |
| 5,572,924 | A * | 11/1996 | Crnjanski | 99/426 |
| 5,611,441 | A * | 3/1997 | Bartko | 211/181.1 |
| 5,626,098 | A * | 5/1997 | Askins et al. | 119/474 |
| 5,638,742 | A * | 6/1997 | Kassaseya | 99/426 |
| D387,949 | S * | 12/1997 | Bentson | D7/409 |
| 5,727,502 | A * | 3/1998 | Askins et al. | 119/499 |
| 5,755,153 | A * | 5/1998 | Su | 99/395 |
| 5,791,235 | A * | 8/1998 | Anselmo | 99/426 |
| 5,823,100 | A * | 10/1998 | Wienhold et al. | 99/449 |
| 5,943,982 | A * | 8/1999 | Askins et al. | 119/499 |
| 6,076,453 | A * | 6/2000 | Hsu | 99/421 H |
| 6,079,574 | A * | 6/2000 | Mylander et al. | 211/106 |
| 6,116,153 | A * | 9/2000 | Burrows | 99/426 |
| 6,119,588 | A * | 9/2000 | Tiemann | 99/426 |
| 6,129,222 | A * | 10/2000 | Mylander et al. | 211/106 |
| 6,131,506 | A * | 10/2000 | Kemper | 99/425 |
| 6,164,194 | A * | 12/2000 | Westmoreland | 99/426 |
| 6,192,834 | B1 * | 2/2001 | Kolozsvari | 119/498 |
| 6,347,577 | B1 * | 2/2002 | Harneit | 99/427 |
| 6,367,373 | B1 * | 4/2002 | Bargman | 99/427 |
| 6,386,096 | B1 * | 5/2002 | Tiemann | 99/426 |
| 6,415,934 | B1 * | 7/2002 | Veltrop et al. | 211/85.4 |
| 6,450,087 | B2 * | 9/2002 | Backus et al. | 99/427 |
| 6,499,393 | B2 * | 12/2002 | Waltman | 99/426 |
| D472,423 | S * | 4/2003 | Swinford et al. | D7/359 |
| 6,658,991 | B2 * | 12/2003 | Backus et al. | 99/395 |
| 6,668,708 | B1 * | 12/2003 | Swinford et al. | 99/426 |
| 6,681,720 | B1 * | 1/2004 | Skurdalsvold et al. | 119/474 |
| 6,772,555 | B2 * | 8/2004 | Evans et al. | 43/61 |
| 6,782,805 | B2 * | 8/2004 | Backus et al. | 99/421 H |
| 6,823,773 | B2 * | 11/2004 | Swinford et al. | 99/426 |
| 6,874,408 | B2 * | 4/2005 | Backus et al. | 99/327 |
| 7,003,913 | B1 * | 2/2006 | Smith | 47/44 |
| 7,021,203 | B2 * | 4/2006 | Backus et al. | 99/421 H |
| D532,653 | S * | 11/2006 | Molayem | D7/409 |
| D534,395 | S * | 1/2007 | Home | D7/409 |
| D542,092 | S * | 5/2007 | Raichlen et al. | D7/409 |
| 7,225,729 | B2 * | 6/2007 | Backus et al. | 99/339 |
| 7,225,730 | B2 * | 6/2007 | Backus et al. | 99/419 |
| D555,977 | S * | 11/2007 | Gonzalez et al. | D7/409 |
| D577,256 | S * | 9/2008 | Schutte | D7/409 |
| 7,587,973 | B2 * | 9/2009 | Kaliveh et al. | 99/450 |
| 2006/0196367 | A1 * | 9/2006 | Osterman | 99/419 |
| 2008/0295707 | A1 * | 12/2008 | Levie | 99/494 |

\* cited by examiner

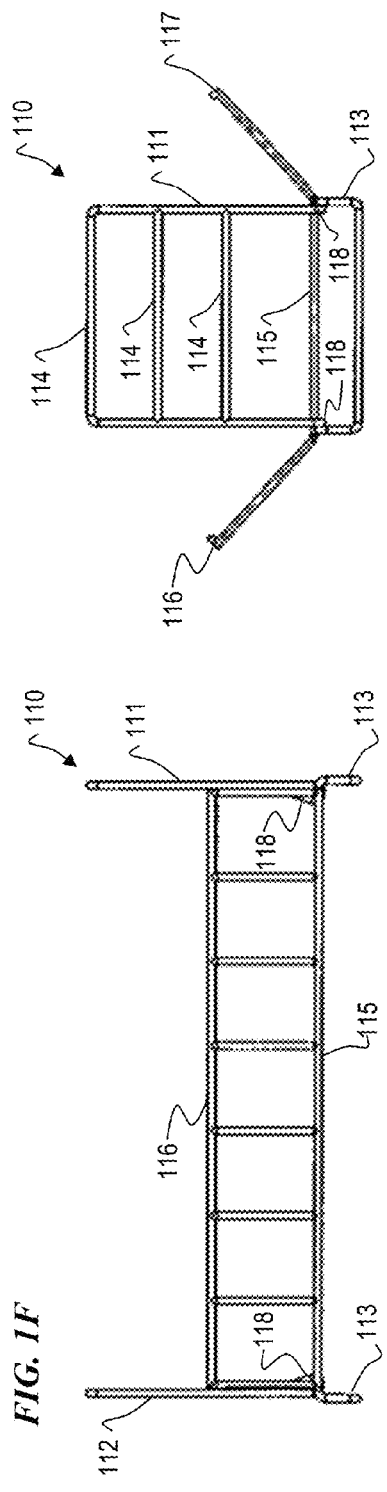
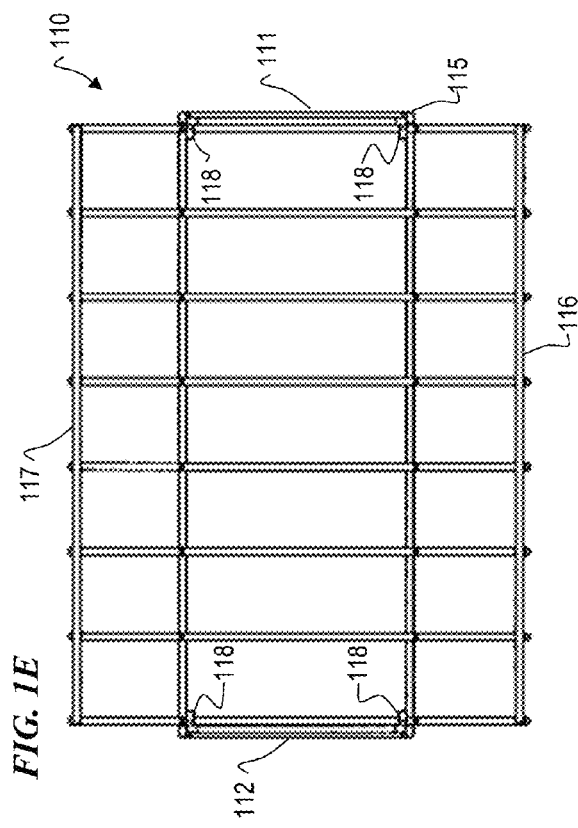

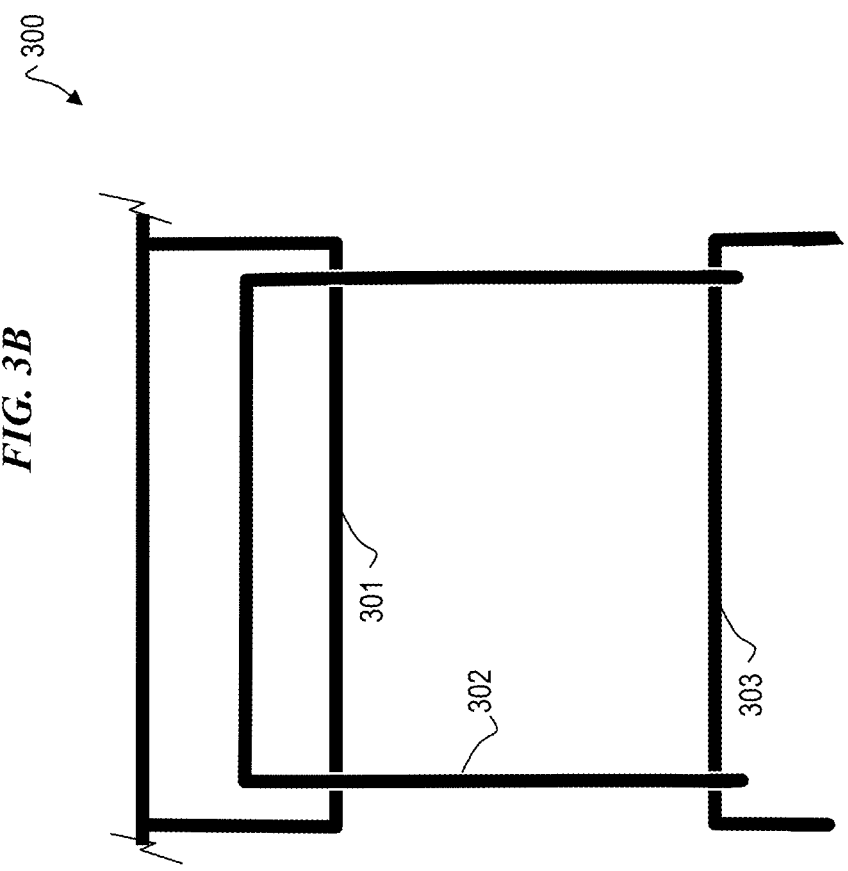
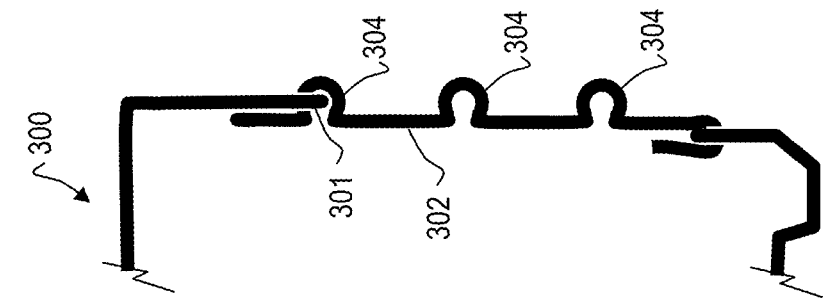

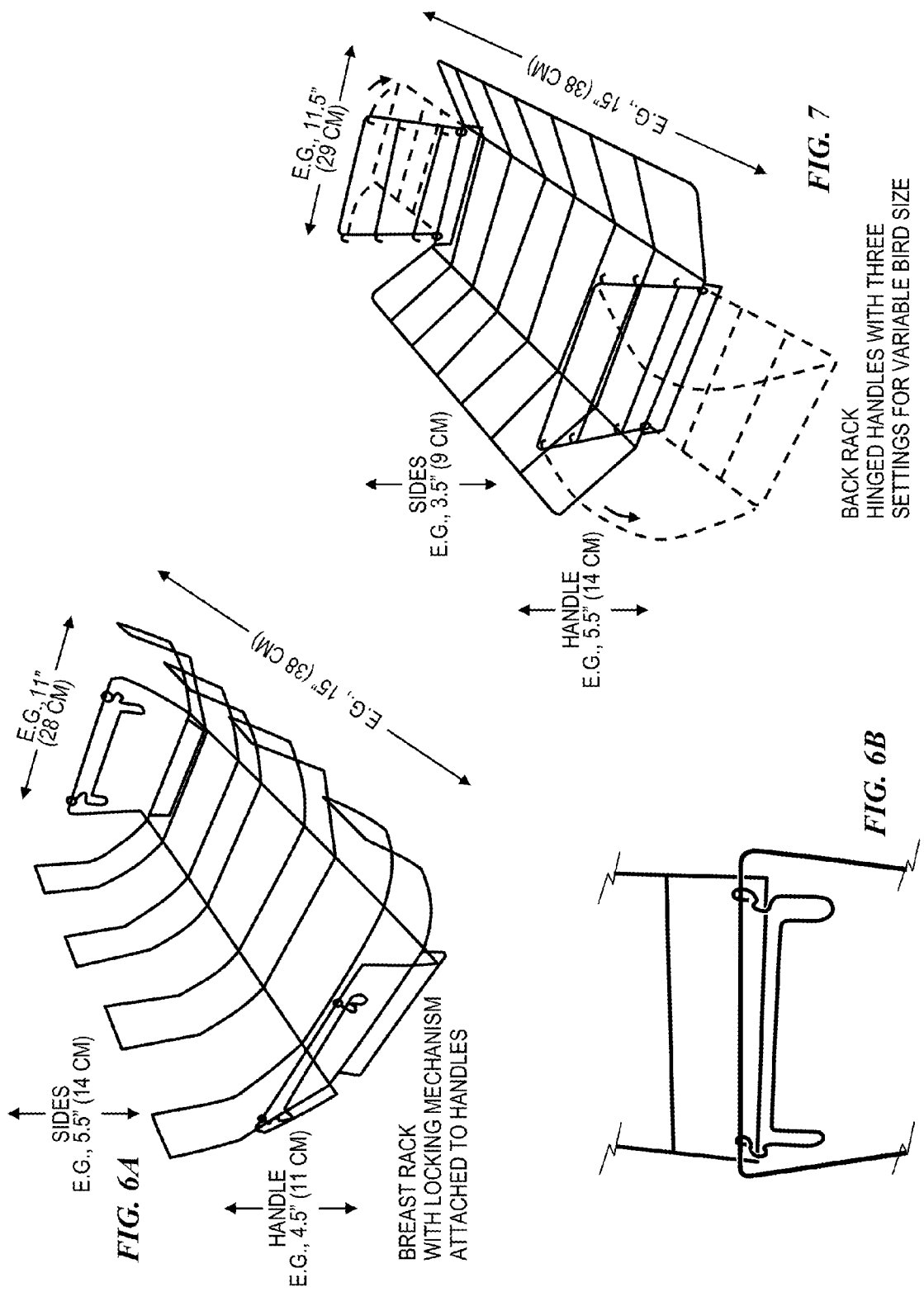

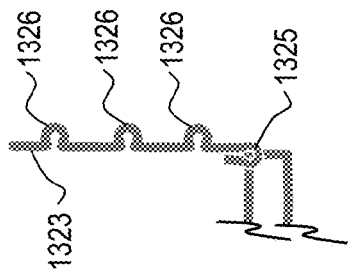
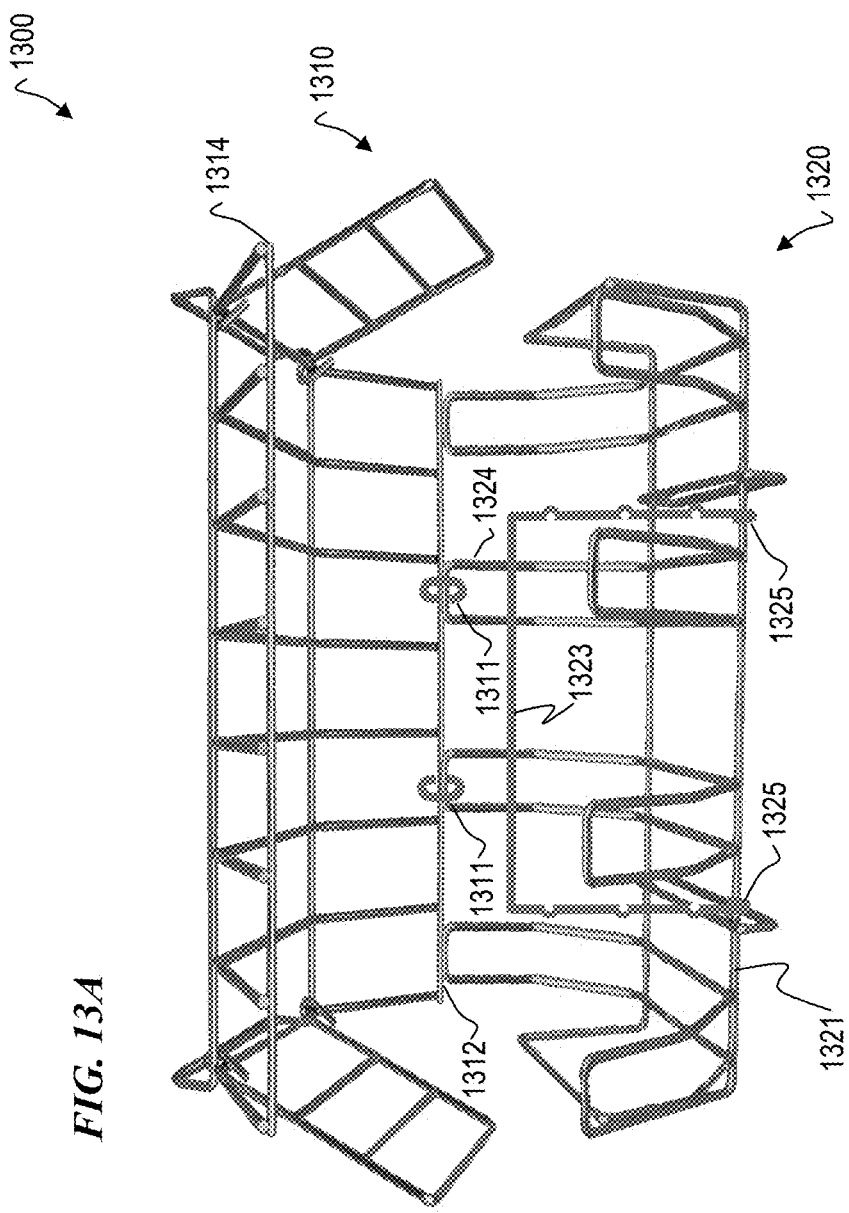

TURKEY FLIPPER AND METHOD FOR MAKING AND USING

CROSS-REFERENCE TO RELATED APPLICATIONS

This application claims priority benefit under 35 U.S.C. §119(e) to U.S. Provisional Patent Application 61/099,742 filed on Sep. 24, 2008, titled "Turkey Flipper," which is incorporated herein by reference in its entirety.

FIELD OF THE INVENTION

The present invention relates generally to cooking and roasting. More particularly, the present invention relates to cooking apparatus in which the food receiver is so mounted or supported that the same can be adjusted, moved, or transported, and to cooking or roasting turkeys and other large or non-uniform pieces of meat that may have different cooking times for different parts of the meat and are susceptible to drying out during the cooking process.

BACKGROUND OF THE INVENTION

When meat is cooked, it is often susceptible to becoming dry and tough. Particularly, when a large piece of meat that does not have a uniform cooking time, such as a turkey, is cooked, certain portions of the meat can become overcooked and dry. If a turkey is cooked for an extended period of time to ensure that all portions are thoroughly cooked, it is even more likely that the portions of the meat that cook more quickly will become dry and tough. Generally, with a turkey, the breast meat dries out before the dark meat is completely cooked.

Methods have been used to prevent the breast meat of a turkey from drying out during the cooking process. For example, turkeys have been soaked in a brine solution before cooking. Other methods that have been used to prevent turkeys from drying out include basting during the cooking process. Other methods of cooking a turkey with moist breast meat include using specialty equipment such as deep flying or cooking on a rotisserie.

Those of skill in the art know that to have a tender, juicy and moist breast meat, the breast needs to be cooked to an internal temperature of no greater than approximately 164° F. (73° Celsius). The legs of the turkey or other bird, however, must be cooked at a temperature of from approximately 175° F. (79° Celsius) to approximately 180° F. (82° Celsius) or else the meat in the legs will be pink and chewy. Accordingly, it is desirable to cook the legs of a turkey at a faster rate than the breast.

However, when a turkey is cooked in the traditional manner in an oven with the breast side up, the breast is cooked at a faster rate than the legs. The breast is closest to the roof of the oven, which is hotter than the rest of the oven. Additionally, when the turkey is cooked with the breast side up, gravity pulls the turkey juices away from the breast. In this manner, when the legs of the turkey are fully cooked, often the breast is overcooked and dry.

Therefore, those of skill in the art have attempted to cook a turkey with the breast side down to keep moisture in the breast during cooking. However, when this method is employed, it is often desirable to flip the turkey over during the cooking process so that the breast side is facing up in the latter part of the cooking process. Cooking a turkey with the breast side up for a portion of the cooking time (preferably the latter portion) allows the skin of the turkey to become brown and crisp.

Flipping over or inverting a turkey during the cooking process presents challenges to those of skill in the art. Specifically, turkeys are often large and slippery and, because they are cooked at such high temperatures, the turkeys and the pans in which they are cooked reach extremely high temperatures during the cooking process. Accordingly, it is often difficult and can be dangerous for one to handle a turkey in such a manner as is required to flip a turkey over.

Examples of Conventional Roasting Racks:

U.S. Pat. No. 2,102,097 titled "Cooking Apparatus" issued to Sherman Dec. 13, 1937 is particularly applicable to apparatus in which cooking is accomplished by electrically generated heat, and provides an improved cooking apparatus in which heat may be applied either to two sides of an article to be cooked or to a single side thereof.

U.S. Pat. No. 3,220,335 titled "Device for Cooking Meat and the Like" issued to Rodrigue Nov. 30, 1965 provides meat racks into which can be conveniently and easily placed the meat to be cooked and which are of such a construction that the meat can be quickly, safely and easily turned.

U.S. Pat. No. 3,359,889 titled "Turkey Turner" issued to Young et al. Dec. 26, 1967 describes a device which facilitates turning meat and helps the inexperienced cook to produce even roasts and grills with a minimum of effort.

U.S. Pat. No. 3,566,776 titled "Wire Roasting Frame" issued to Young et al. Mar. 2, 1971 wherein a pair of brackets is integrally secured about a roast to aid in handling. One of the brackets includes at least one hook integral with the bracket body for cooperating with parts on the other bracket to temporarily secure the brackets to one another about the roast, permitting the entire assembly to be handled as a unit.

U.S. Design Pat. No. D303,910 titled "Roasting basket" issued to Sjoberg Oct. 10, 1989 describes the ornamental design for a roasting basket.

Examples of Conventional Rotisseries:

U.S. Pat. No. 553,363 titled "Roasting Pan" issued to Sickles Jan. 21, 1896 will render the cooking of meats more simple and improve the action of the heat thereon by enabling the cook to bring all parts of the meat in proper relative position to the heating-surfaces without having to remove such meat from the pan and also to hold said meat in the most desirable shape.

U.S. Pat. No. 3,084,618 titled "Food Holder" issued to Dieterich Apr. 9, 1963 relates generally to rotisserie cooking, and particularly to a grip for clamp for holding food while it is being turned before the heat, as if it were on a spit.

U.S. Pat. No. 3,922,961 titled "Rotary cooking device" issued to Case Dec. 2, 1975 wherein a rotary cooking device having two separate hub elements to be mounted for rotation about a common axis and adjustably carrying two grill parts for engaging opposite sides of a roast or other piece of meat to clamp the meat between the grills.

U.S. Pat. No. 4,005,646 titled "Rotatable grill" issued to Kruper Feb. 1, 1977 wherein a rotatable grill for demountably retaining food objects consisting of a first basket half and a second basket half which is similar in size to the first basket half and a pivotable bracket means for adjustably joining the ends of the bracket halves to form a closed basket at their longitudinal sides.

U.S. Pat. No. 4,442,763 titled "Meat Roaster" issued to Beller Apr. 17, 1984 wherein a meat roaster has a horizontal spit basket comprising confronting sets of grate fingers for gripping meat items to be roasted and means for adjusting the separation between the potentially telescoping sets which allows the user to tighten the grip on the shrinking meat during roasting.

U.S. Pat. No. 5,755,153 titled "Meat roasting device" issued to Su May 26, 1998 wherein a meat roasting device having an automatically rotated barbecue grill mainly comprising: a furnace frame, a barbecue grill, and a driving device, wherein said driving device is fixed on the support plate of the furnace frame, and is engageable with a barbecue grill having an elastic clamping force by a driving bushing.

U.S. Pat. No. 6,347,577 titled "Rotisserie basket for grills" issued to Harneit Feb. 19, 2002 describes a rotisserie basket for cooking whole chickens, roasts, etc. without the need to pierce the food with a spit or rod as in other, conventional rotisserie baskets.

U.S. Pat. No. 6,367,373 titled "Rotisserie cradle" issued to Bargman Apr. 9, 2002 describes a rotisserie cradle including a trough shaped cradle constructed entirely of a rod framework to be lighter, easier to clean, and cheaper to manufacture, with food hold down grates positionable by swing arms pivoted to the inside of the cradle framework so as to allow manually settable positioning of the grates against the food to hold the same against the inside of the cradle framework.

Examples of Other Conventional Food-Holding Devices:

U.S. Pat. No. 4,848,217 titled "Multipurpose cooking rack" issued to Koziol Jul. 18, 1989 wherein a multipurpose cooking rack which can support large sizes of meat when in one position and smaller sizes of food items such as meat and vegetables when in an inverted position.

U.S. Pat. No. 5,791,235 titled "Device for roasting poultry" issued to Anselmo Aug. 11, 1998 wherein the invention is a device for roasting a poultry item having a breast portion to be faced downward, first and second leg portions, and first and second wing portions.

United States Patent Application Publication 2006/0196367 "Roasting apparatus" issued to Osterman Sep. 7, 2006 wherein a roasting apparatus for cooking meat in an oven includes a rod, a pair of hooks and a frame.

Each of the above devices has one or more shortcomings. There is thus a continuing, ongoing need for an apparatus that can be used to manually flip over a turkey (or other food item) between stages of the cooking process. Preferably, such an apparatus allows the turkey to be cooked initially with the breast side down and then with the breast side up during the latter stages of the cooking process.

SUMMARY OF THE INVENTION

In some embodiments, the present invention provides an apparatus that includes: a plurality of racks including a first rack and a second rack, wherein the plurality of racks are configured to releasably attach to one another and to surround a food item during a manual inversion operation of the food item between a first cooking period and a second cooking period, wherein each one of the plurality of racks has a first end and an opposite second end. The first rack includes: a plurality of handles including a first handle on the first end of the first rack and a second handle on the second end of the first rack, and wherein the plurality of handles are configured to be manually grasped during the manual inversion of the food item, a first height-adjustment mechanism attached to the first rack and configured to set a spacing between the first rack and the second rack such that the spacing is adjustable to hold food items of various sizes, and a plurality of feet including a first foot and a second foot on the first rack, wherein the plurality of feet are configured to hold the food item being cooked raised above a bottom of a cooking container during at least one of the first and the second cooking period; and a first latch mechanism configured to releasably latch the second rack to the first height-adjustment mechanism of the first rack for at least a duration of the manual inversion operation, wherein the first latch mechanism is also configured to release the plurality of racks from one another.

In some embodiments, the present invention provides a method that includes providing a plurality of racks including a first rack and a second rack, wherein the plurality of racks are configured to releasably attach to one another and to surround a food item during a manual inversion operation of the food item between a first cooking period and a second cooking period, wherein each one of the plurality of racks has a first end and an opposite second end, and wherein the providing of the first rack includes: forming a plurality of handles including a first handle on the first end of the first rack and a second handle on the second end of the first rack, and wherein the plurality of handles are configured to be manually grasped during the manual inversion of the food item. The method further includes attaching a first height-adjustment mechanism to the first rack and configuring the first height mechanism to set a spacing between the first rack and the second rack such that the spacing is adjustable to hold food items of various sizes, and forming a plurality of feet including a first foot and a second foot on the first rack, wherein the plurality of feet are configured to keep the food item being cooked raised above a bottom of a cooking container during at least one of the first and the second cooking period; and providing a first latch mechanism and configuring the first latch mechanism to releasably latch the second rack to the first height-adjustment mechanism of the first rack for at least a duration of the manual inversion operation, and configuring the first latch mechanism to release the plurality of racks from one another.

Another aspect of the present invention includes a kit having a pan; a plurality of racks including a first rack and a second rack, wherein the plurality of racks are configured to releasably attach to one another and to surround a food item during a manual inversion operation of the food item between a first cooking period and a second cooking period, wherein each one of the plurality of racks has a first end and an opposite second end. The first rack includes a plurality of handles including a first handle on the first end of the first rack and a second handle on the second end of the first rack, and wherein the plurality of handles are configured to be manually grasped during the manual inversion of the food item, a first height-adjustment mechanism attached to the first rack and configured to set a spacing between the first rack and the second rack such that the spacing is adjustable to hold food items of various sizes, and a plurality of feet including a first foot and a second foot on the first rack, wherein the plurality of feet are configured to keep the food item being cooked raised above a bottom of a cooking container during at least one of the first and the second cooking period. The first rack also includes a first latch mechanism configured to releasably latch the second rack to the first height-adjustment mechanism of the first rack for at least a duration of the manual inversion operation, wherein the first latch mechanism is also configured to release the plurality of racks from one another. The racks are configured to rest on their feet on the bottom on the pan.

BRIEF DESCRIPTION OF THE DRAWINGS

FIG. 1E is a top view of a first rack in accordance with the present invention.

FIG. 1F is a side view of a first rack in accordance with the present invention.

FIG. 1G is an end view of a first rack in accordance with the present invention.

FIG. 3A is a side view of a latch mechanism.

FIG. 3B is a front view of a latch mechanism.

FIG. 6A is a perspective view of a breast rack in accordance with some embodiments of the present invention.

FIG. 6B is a detail view of a wire formed latch mechanism on a breast rack in accordance with some embodiments of the present invention FIG. 7 is a perspective view of a back rack in accordance with some embodiments of the present invention.

FIG. 13A is a perspective view of a turkey flipper with a side height adjustment and latching mechanism in accordance with some embodiments of the present invention.

FIG. 13B is a side view of a height-adjustment-latch mechanism in accordance with some embodiments of the present invention

DETAILED DESCRIPTION

Figure 1A:
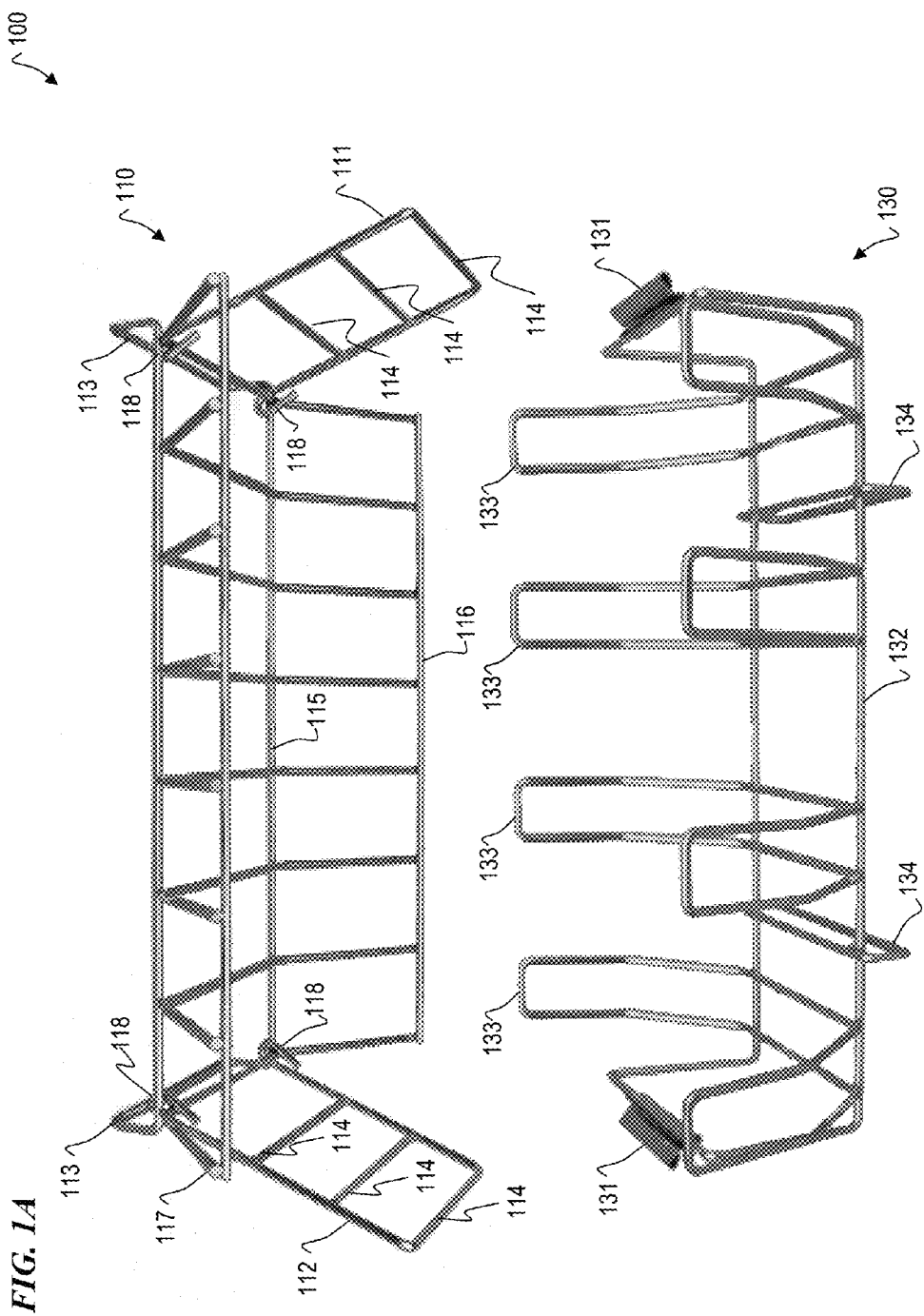
FIG. 1A is a perspective view of a plurality of racks 100 in accordance with some embodiments of the present invention.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. While this invention is susceptible of an embodiment in many different forms, there are shown in the drawings and will be described herein in detail a specific embodiment thereof with the understanding that the present disclosure is to be considered as an exemplification of the principles of the invention. It is not intended to limit the invention to the specific illustrated embodiments.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in a plurality of figures. Signals and connections may be referred to by the same reference number or label, and the actual meaning will be clear from its use in the context of the description.

In some embodiments, the present invention includes a two piece cooking rack, or turkey flipper, for cooking and flipping turkeys, large birds, or large roasts that benefit from being flipped or turned during the cooking process. The turkey or other piece of meat can be cooked in the turkey rack with the breast side (or the side requiring slower cooking) down, allowing for certain portions of the meat to cook faster and for juices in the turkey to flow into the breast. Then, the turkey can be flipped over to cook breast side up, allowing the skin on the breast to become brown and crisp. For larger roasts, the meat can be flipped during the cooking process to allow each side to cook evenly.

Cooking the turkey or other bird with the breast side down produces a moist, juicy, tender, and succulent breast. When the breast side faces downward, it is away from the oven roof and the juices of the turkey flow toward the breast rather than away from the breast. Also, when the breast side faces downward, the legs of the turkey are on top and are exposed to the hot oven roof, allowing them to cook more quickly.

Flipping the turkey over during the cooking process allows the skin of the breast to brown because, when the breast side faces upward, the skin of the breast is exposed to the oven roof. In this manner, embodiments of the claimed invention produce a turkey or other bird with moist breast meat, thoroughly cooked dark meat, and browned skin on the outside of the breast. Further embodiments of the claimed invention produce a large roast that is evenly cooked and browned.

Some embodiments of the claimed invention include a breast rack and a back rack. A turkey or other bird can be placed in the breast rack with the breast side down for the first portion of the cooking process. In embodiments of the claimed invention, the breast rack can have dimensions suitable for placing the breast rack in a roasting pan during cooking.

The breast rack can have handles that extend in an upward direction when the rack is positioned in the bottom of the roasting pan. The handles can be hinged and can be adjustable. The back rack can have handles that extend in a downward direction when the back rack is placed on top of a turkey that is breast side down in the breast rack. The handles of the back rack can also be hinged and adjustable. The handles of the breast rack and the back rack can be secured, locked or latched to one other such that the breast rack and the back rack can securely hold a turkey there between without the user having to exert pressure on the handles to hold the handles and the breast and back racks together. The adjustability of the handles allows them to be positioned to securely hold turkeys or other food of various sizes.

During the cooking process, the breast rack is placed in the bottom of the roasting pan and the turkey or other bird is placed breast side down on the rack. The roasting pan with the breast rack and bird can be placed in the oven to cook. When it is time to flip the turkey, the pan can be removed from the oven, and a user can place the back rack over the back of the turkey such that the back rack is in contact with the back of the turkey or other bird. The user can then lock, latch, or secure the handles of the breast rack and back rack together. This secures the breast and back racks together. The mechanism for locking, latching or securing the racks together can also be adjustable to accommodate birds of slightly different sizes. The user can then flip the turkey from breast side down to breast side up with less risk that the turkey will slip or fall from the turkey rack. After flipping, the turkey can be situated in the roasting pan on the back rack with the breast side up, with both racks still secured to one another. Then, the breast rack can be removed by unlocking, unlatching, or unsecuring the handles of the breast rack and the back rack. The roasting pan, with the turkey situated on the back rack breast side up, can then be seasoned or basted if desired and placed back into the oven to finish cooking.

The breast and back racks are configured such that they can overlap each other to accommodate different-sized turkeys, birds, or roasts. In addition, the handles of the breast rack and the back rack can be secured to one another in a plurality of different positions. This allows the breast and back racks to be secured to one another in a plurality of overlapped positions as necessary to adjust for the size of the turkey, bird or roast to be flipped. For example, for a smaller bird or roast the sides of the breast and back racks will overlap to a greater extent than for a medium bird. The sides will overlap until the racks are each touching the surface of the bird or roast. The handles can then be secured to one another in a first position so that the breast rack and back rack are fixedly secured in the required overlap position. As another example, for a larger bird or roast, the sides of the breast and back rack will overlap to a lesser extent, or will not overlap at all. The handles can be secured to one another in a second or third position so that the breast rack and the back rack are fixedly secured to one another in the required position. It is anticipated that the handles will have a plurality of positions to accommodate different sized birds or roasts. Further, the handles can be flexibly attached to the rack with, for example with springs, so that they can be further adjusted to hold the turkey or other bird more securely if a position in between one of the set positions is necessary. It is also contemplated that the mechanism for locking, latching or securing the handles together can be adjustable to allow for slight adjustments in the space between the racks to accommodate slightly different sized birds.

In this manner, the turkey flipper can accommodate turkeys, birds, or roasts of varying sizes, weights, diameters, and girths. For example, when a small turkey is being cooked with the turkey flipper, the handles can be secured to one another in the first position as described above. In this manner, the turkey is securely situated between the breast rack and the back rack, and will not move or slide within the racks during flipping. It is intended that the bird or roast only move minimally, if at all. Because turkeys and other birds are tender, and it is preferred that the breast skin is left intact while not being ripped or torn, it is desirable to keep the bird secure during flipping to prevent bruising of the meat, tearing of the skin and the like.

Similarly, when a larger bird is being cooked with the turkey flipper, the handles can be secured to one another in the second or third positions as described above. In this manner, the area between the breast rack and the back rack is large enough to accommodate the size and diameter of the turkey and yet the turkey is still securely situated between the breast rack and the back rack. With the handles securely locked or latched together, the user does not have to exert pressure to hold the handles together, making it easier to flip the bird or roast. Having the handles lock also secures the rack in a closed position, thereby keeping the bird or roast secure during flipping. A flexible attachment of the handles and or the locking, latching or securing mechanism can allow for minute adjustments if the bird is in between two of the securing positions on the handles. The locking handles aid in preventing accidents that may occur if a large bird or roast slips from the rack or shifts during flipping. Such movement within the rack can cause the user to lose control of the hot bird or roast, resulting in dropping the bird or roast into the pan, splashing the user with hot drippings, dropping the bird or roast onto the floor, or knocking over the pan filled with hot drippings. Such accidents can result in burns to the user and the loss of or damage to the bird or roast.

Figure 1B:
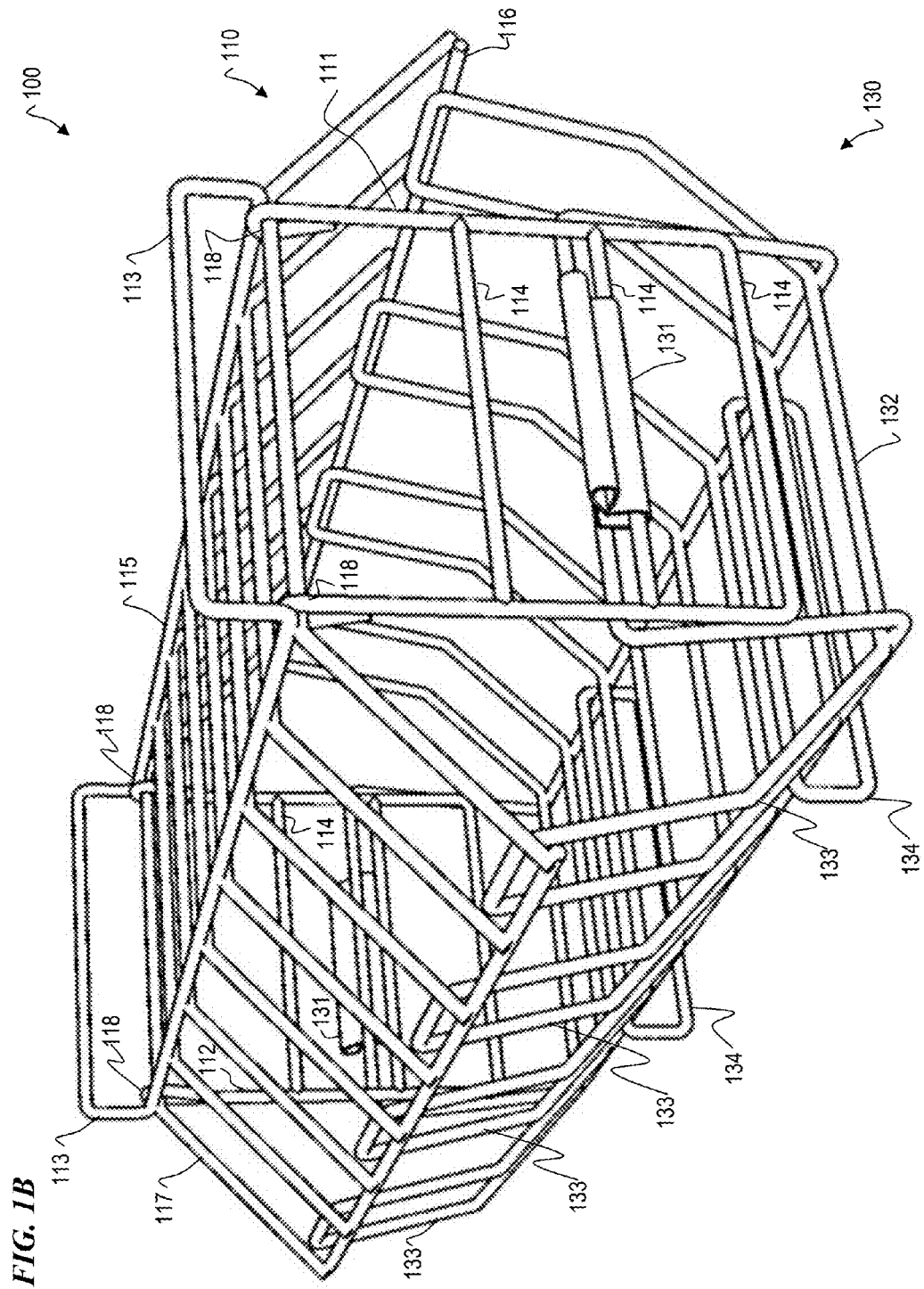
FIG. 1B is a perspective view of a plurality of racks 100 in accordance with the present invention.
Figure 1C:
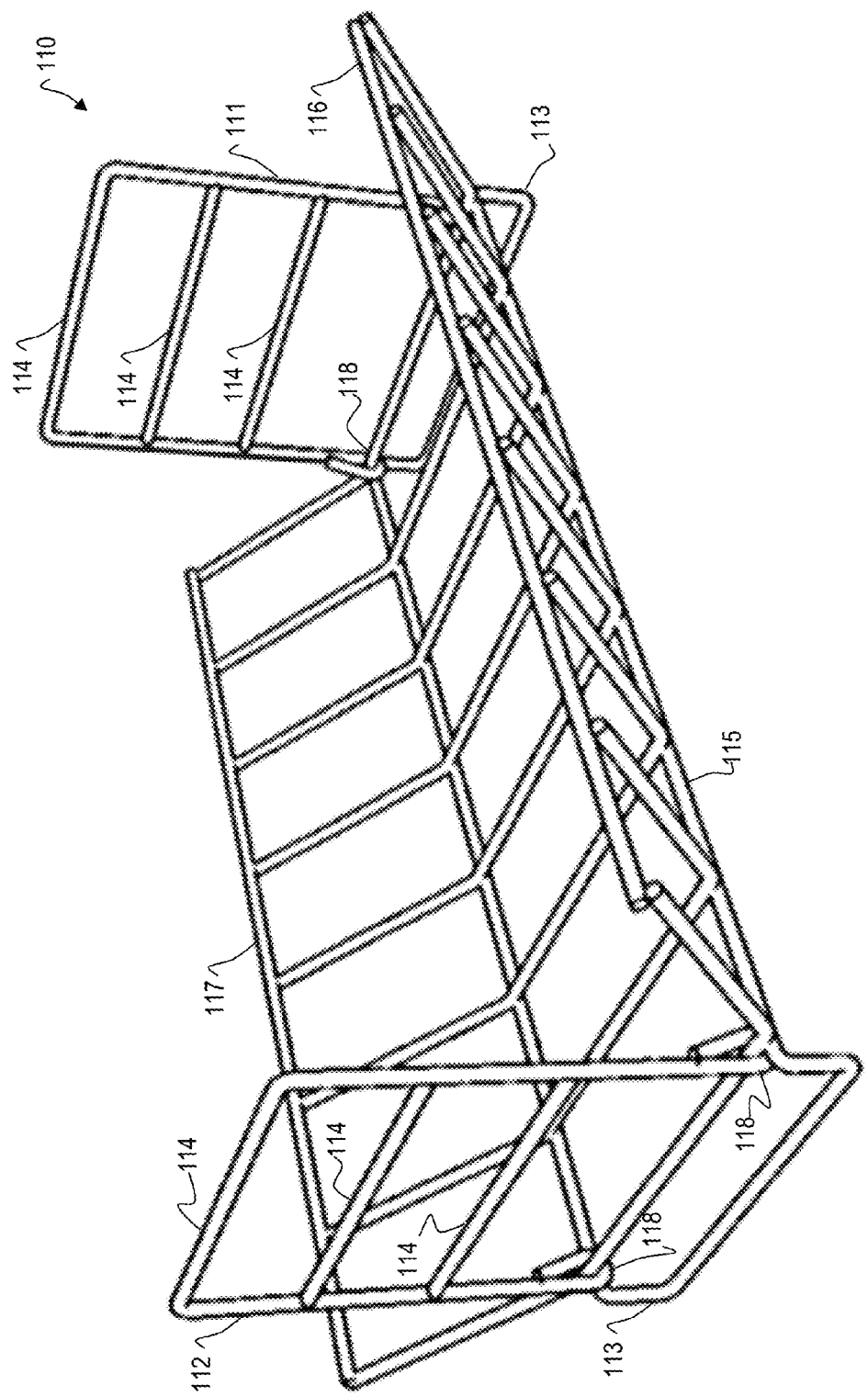
FIG. 1C is a perspective view of a first rack in accordance with the present invention.
Figure 1D:
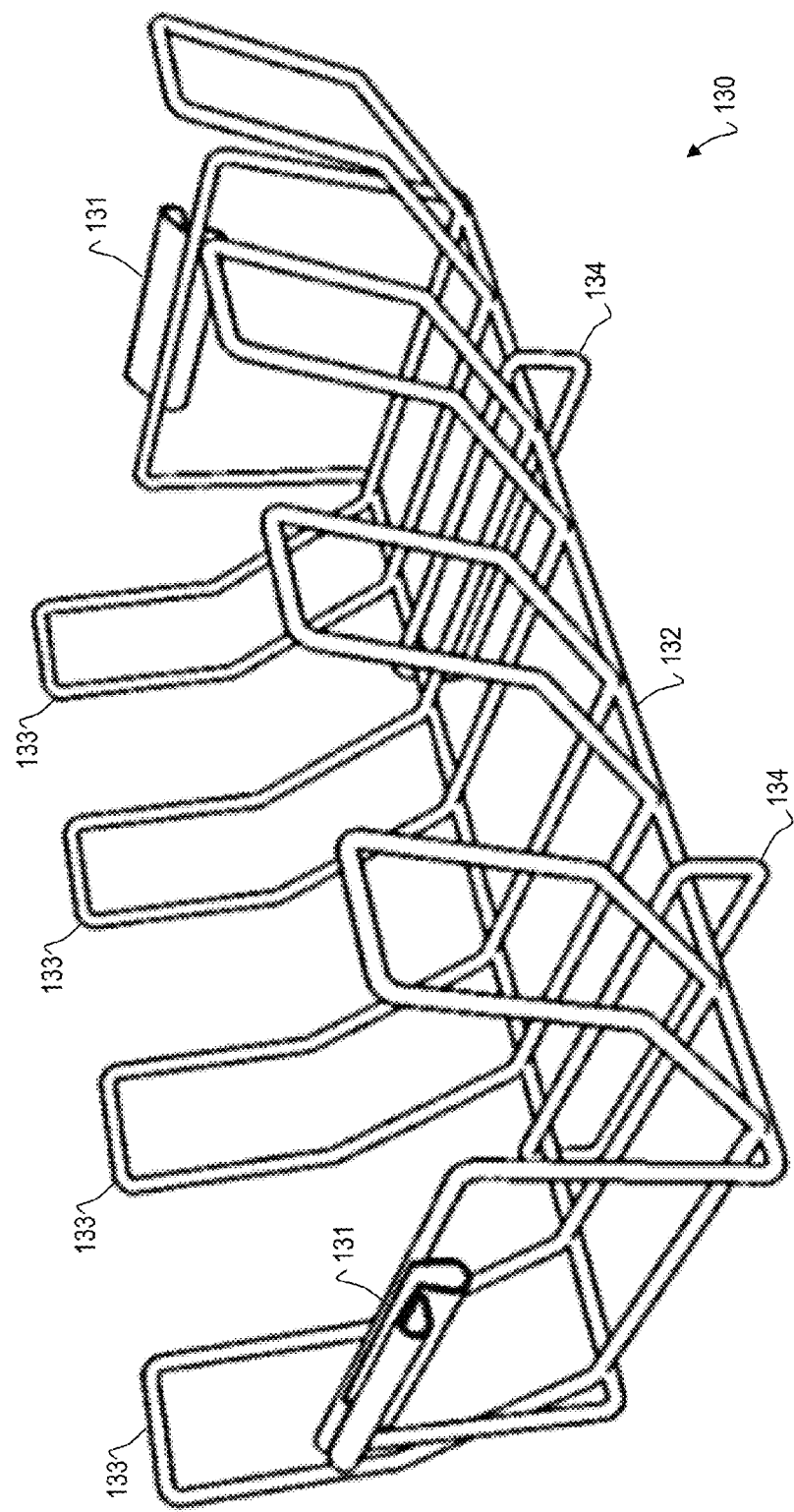
FIG. 1D is a perspective view of a second rack in accordance with the present invention.
Figure 1H:
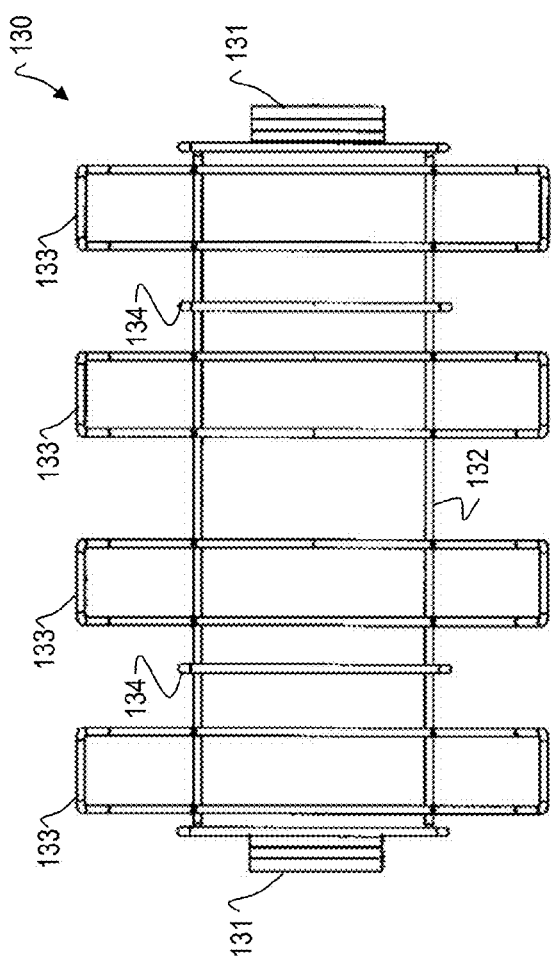
FIG. 1H is a top view of a second rack in accordance with the present invention.
Figure 1I:
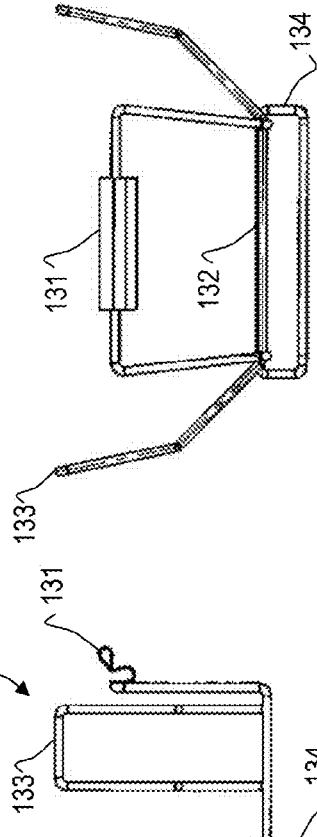
FIG. 1i is a side view of a second rack in accordance with the present invention.
Figure 1J:
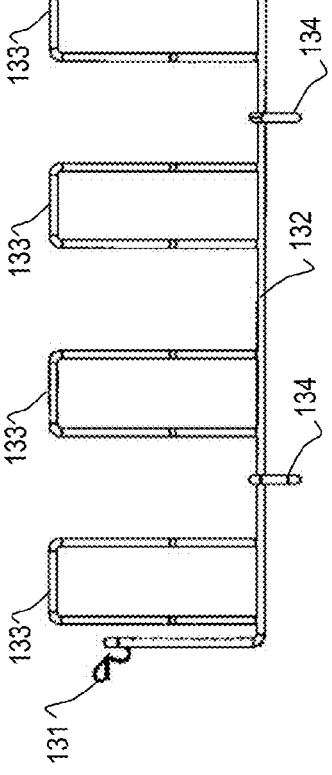
FIG. 1J is an end view of a second rack in accordance with the present invention.

In some embodiments, the present invention provides an apparatus that includes a plurality of racks 100 including a first rack 110 and a second rack 130, as shown in FIG. 1A. FIG. 1A is a perspective view of a plurality of racks 100 in accordance with some embodiments of the present invention. FIG. 1B is a perspective view of a plurality of racks 100. FIG. 1C is a perspective view of a first rack. FIG. 1D is a perspective view of a second rack. FIG. 1E is a top view of a first rack. FIG. 1F is a side view of a first rack. FIG. 1G is an end view of a first rack. FIG. 1H is a top view of a second rack. FIG. 1i is a side view of a second rack. FIG. 1J is an end view of a second rack.

In some embodiments, the present invention provides an apparatus that includes a plurality of racks 100 (as shown in FIG. 1A through FIG. 1J) including a first rack 110 and a second rack 130, wherein the plurality of racks 100 are configured to releasably attach to one another and to surround a food item during a manual inversion operation of the food item between a first cooking period and a second cooking period, wherein each one of the plurality of racks has a first end and an opposite second end, and wherein the first rack includes: a plurality of handles including a first handle 111 on the first end of the first rack and a second handle 112 on the second end of the first rack, and wherein the plurality of handles are configured to be manually grasped during the manual inversion of the food item, wherein the handles 111, 112 are attached to transverse members of the base 115 with wire loops 118 such that the handles are free to rate about the transverse base members. The first rack 110 further includes a plurality of feet including a first foot 113 and a second foot 113 on the first rack, wherein the plurality of feet 113 are configured to keep the food item being cooked raised above a bottom of a cooking container during at least one of the first and the second cooking periods. The first rack 110 further includes a first height-adjustment mechanism 114 attached to the first rack 110 and configured to set a spacing between the first rack 110 and the second rack 130 such that the spacing is adjustable to hold food items of various sizes. In some embodiments the height adjustment mechanism allows the spacing between the first rack 110 and the second rack 130 to be independently adjusted at each end of the plurality of racks 100, such that irregularly shaped food items can be more securely held during the inversion of the food item.

The plurality of racks 100 further includes first latch mechanism 131 configured to releasably latch the second rack 130 to the first height-adjustment mechanism 114 of the first rack 110. Having the plurality of racks securely attached to each other simplifies the food inversion operation because no hand strength is required to hold the plurality of racks together during the manual food inversion operation. The first latch mechanism 131 is also configured to release the plurality of racks from one another. In some embodiments the latch mechanism 131 on the second rack 130 serves as handles for the second rack. Having handles 112 and 131 on each of the plurality of racks 100 allows each rack to be easily lifted when being used independently.

A use of the preferred embodiment of the present invention is as follows: a food item to be cooked is placed in the second rack 130. If the food item is a turkey, it would be placed breast side down in the second rack 130, the second rack and turkey are placed in a roasting pan (not shown), and the combination of the turkey, rack and roasting pan are placed in an oven to cook. After an appropriate amount of time, while the food is still only partially cooked, the pan and rack are removed from the oven. The first rack 110 is attached to the second rack 130 using the height adjustment mechanism 114 and the latching mechanism 131. Having the two racks securely held together allows the turkey and racks to easily be manually lifted from the roasting pan, manually inverted and placed back in the roasting pan with the first rack 110 now on the bottom. The latch mechanisms 131 are released and the second rack 130 removed. The turkey, first rack and roasting pan are placed back in to oven to finish cooking. The present invention provides advantages over prior art in that racks are held together with latches while the food being inverted between cooking so that large amounts of hand strength are not needed and the latches are easily released when an operator of the apparatus is using a heat protection device, such as potholder or oven mitt when handling the hot racks.

In some embodiments, the first rack 110 is configured with a plurality of sides including a bottom 115, a first side 116 and a second side 117, with the long axes of the bottom and of each of the sides substantially parallel and configured with the plane of the first side 116 at a first obtuse angle to the bottom 115 and the plane of the second side 117 at a second obtuse angle to the bottom. The first rack 110 is usable as a back rack, shaped to better conform to a back side of a turkey. The sides 116, 117 of the rack 110 hold the turkey or other food in place as the racks and contained food item are inverted. The shapes of the sides 116, 117 also keep the turkey or other food item on the rack 110 when the rack is being used singly to hold a food item in a roasting pan.

In some embodiments, the second rack 130 is configured with a base 132 and a plurality of frames 133 wherein each frame is configured in a convex shape and is attached to the base, oriented with the axis of curvature substantially parallel to the long axis of the base. The second rack 130 is usable as a breast rack and is shaped to better conform to a breast side of the turkey. The frames 133 of the rack 130 hold the turkey or other food in place as the racks and contained food item are inverted. The shapes of the frames 133 also keep the turkey or other food item on the rack 130 when the rack is being used singly to hold a food item in a roasting pan.

In some embodiments the racks 110 and 130 are of bent and welded steel-wire construction which makes the racks 110, 130 easy to fabricate, is lightweight and provides sufficient strength to allow heavy food items to be safely lifted and inverted. In some embodiments, the wire comprising the base 115 and sides 116, 117 of rack 110, and the base 132 and frames 133 of rack 130 is coated with a high temperature, non-stick coating such as silicone.

In other embodiments, the frames are constructed from a suitable high temperature polymer. In other embodiments, the frames are constructed from flat strips of steel or other metal.

In some embodiments, the feet 113 on the first rack 110 are transversely oriented at the ends of the rack base 115, and the feet 134 on the second rack 130 are transversely oriented and located closer to the ends of the base 132 of the rack base 132 than to the center of the rack base.

Figure 4B:
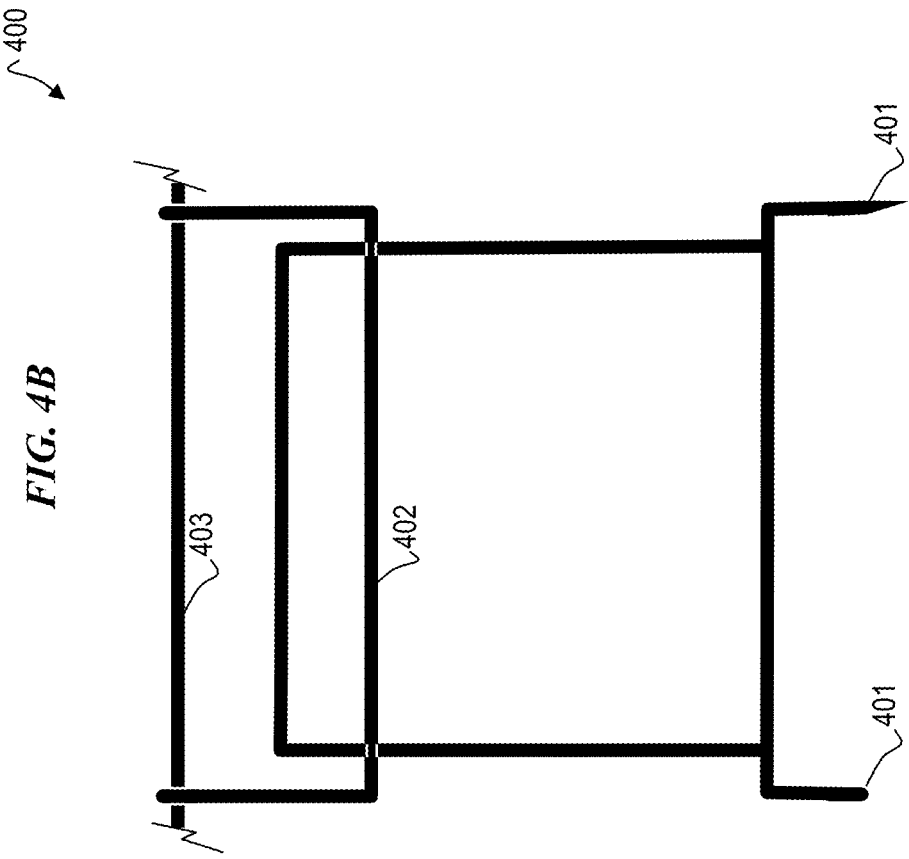
FIG. 4B is a front view of a latch mechanism.
Figure 4A:
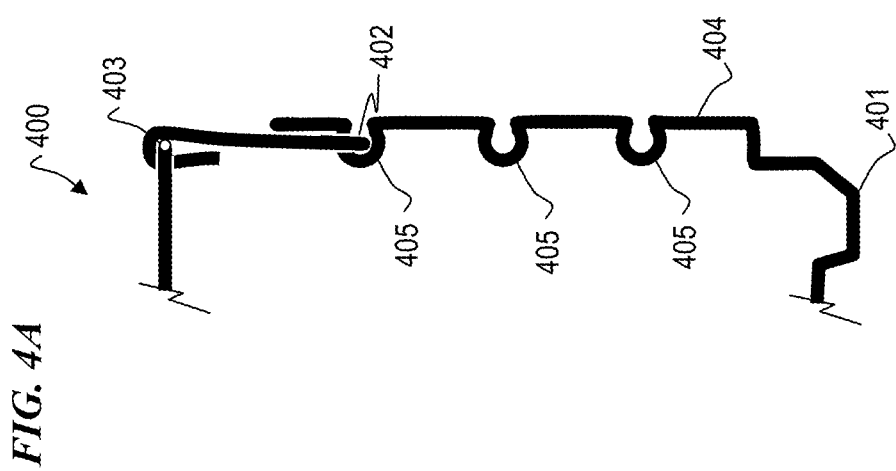
FIG. 4A is a side view of a latch mechanism.

In other embodiments, as shown in FIG. 4A, the feet 401 at either or both ends of any rack are oriented parallel to the long axis of the base.

In some embodiments, the second rack 130 includes a plurality of latch mechanisms 131, one being attached to each end of the rack. Each of the plurality of latch mechanisms includes an elastic receptacle that is configured to grasp one or more of the plurality of attachment points on the height-adjustment mechanism 114 on the corresponding end of the first rack 110 when the first rack is attached to the second rack, and to release the attachment point when the first rack is separated from the second rack. In some embodiments, the latches are constructed of flat spring steel stock.

Figure 1N:
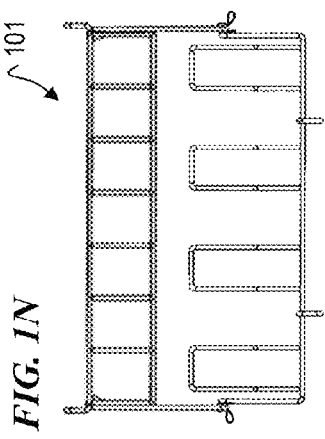
FIG. 1N is a side view of a plurality of racks in accordance with the present invention.
Figure 1M:
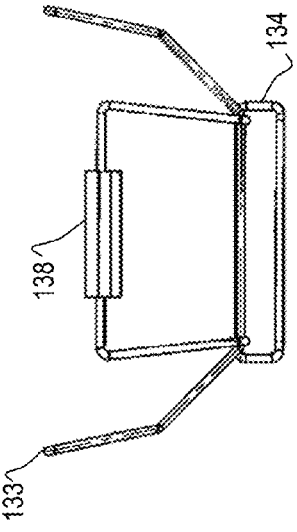
FIG. 1M is an end view of a second rack in accordance with the present invention.
Figure 1K:
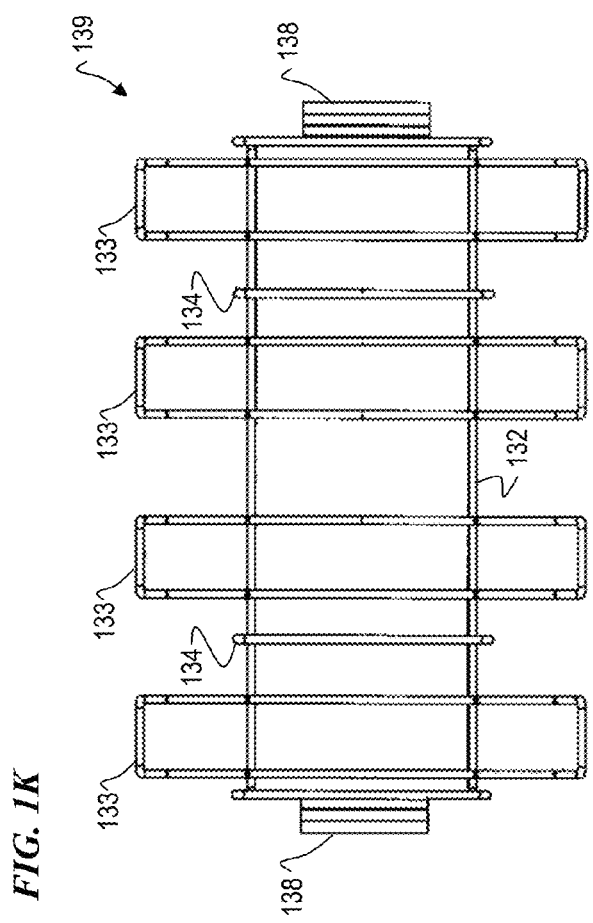
FIG. 1K is a top view of a second rack in accordance with the present invention.
Figure 1L:
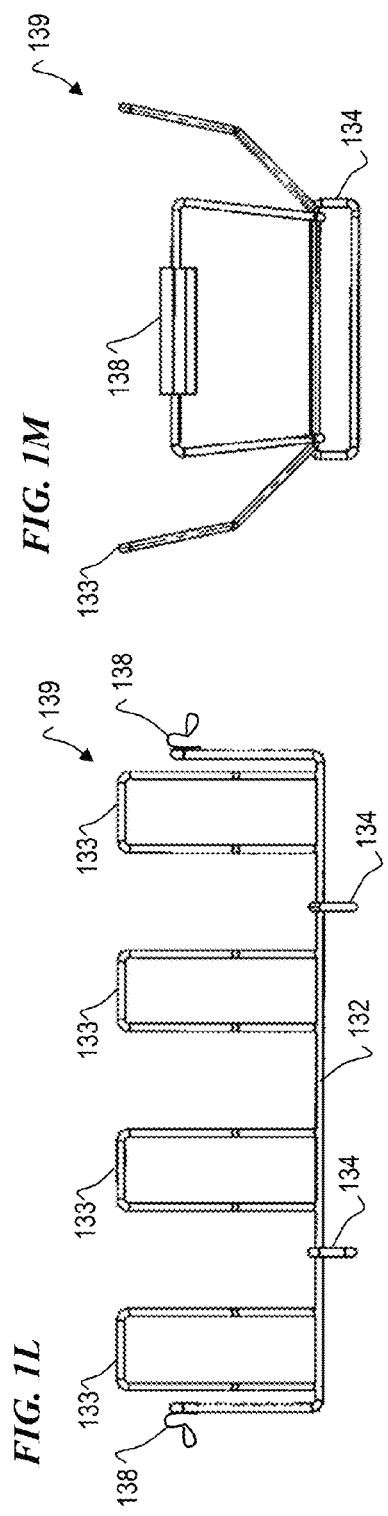
FIG. 1L is a side view of a second rack in accordance with the present invention.

FIG. 1K is a top view of an alternative second rack 139, FIG. 1L is a side view of the alternative second rack 139, and FIG. 1M is an end view of the alternative second rack 139. In such embodiments, the second rack 139 is substantially identical with the second rack 130, but the latching mechanism 131 is inverted 138 so the open end is oriented toward the bottom of the rack 139. FIG. 1N is a side view of a plurality of the alternative racks 101 attached together. This latching mechanism, in some embodiments, more securely fastens the first rack to the second rack when the racks are lifted.

Figure 2B:
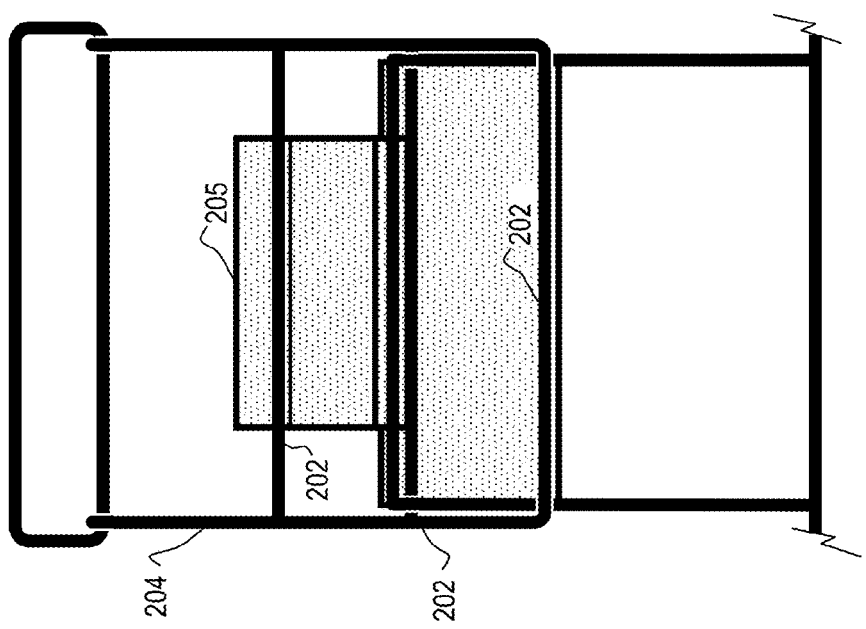
FIG. 2B is a front view of a latch mechanism.
Figure 2A:
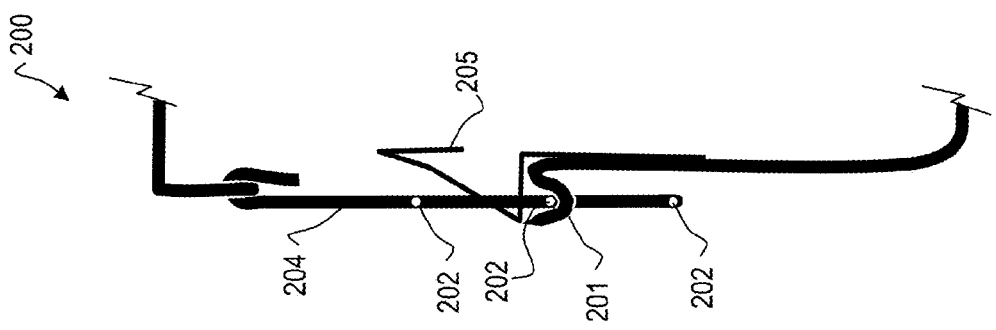
FIG. 2A is a side view of a latch mechanism.

FIG. 2A is a side view of a latch mechanism 200 and FIG. 2B is a front view of the latch mechanism 200. In such embodiments, a latch mechanism 200 includes a substantially non-elastic receptacle 201 that is configured to receive and contain one or more of the plurality of attachment points 202 on a height-adjustment mechanism 204. A spring 205 is configured to allow the one or more of the plurality of attachment points 202 on the height-adjustment mechanism 204 to enter the receptacle 201 and to hold the attachment point within the receptacle 201, and further to release the attachment point 202 when sufficient pressure is manually applied to the spring 205.

FIG. 3A is a side view of a latch mechanism 300 and FIG. 3B is a front view of the latch mechanism 300. In such embodiments, the height-adjustment and latch mechanisms 300 include: a height-adjustment attachment location 301 at each end of the first rack wherein each height-adjustment attachment location 301 serves as a handle of the first rack, and a height-adjustment-latch mechanism 302 at each end of the second rack wherein each height-adjustment-latch mechanism 302 serves as a handle of the second rack and further each one of the plurality of height-adjustment-latch mechanisms rotates about a transverse horizontal axis 303. Each of the plurality of height-adjustment-latch mechanisms 302 includes a plurality of elastic receptacles 304 at differing relative heights. Each of the plurality of elastic receptacles 304 is configured to grasp the height-adjustment attachment location 301 when the first rack is attached to the second rack and to release the height-adjustment attachment location 301 when the first rack is to be separated from the second rack.

FIG. 4A is a side view of a latch mechanism 400 and FIG. 4B is a front view of the latch mechanism 400. In such embodiments, the height-adjustment and latch mechanisms 400 include: a height-adjustment attachment location 402 at each end of the first rack wherein each height-adjustment attachment location 402 serves as a handle of the first rack, and further each one of the plurality of height-attachment locations rotates about a transverse horizontal axis 403, and a height-adjustment-latch mechanism 404 at each end of the second rack wherein each height-adjustment-latch mechanism 404 serves as a handle of the second. Each of the plurality of height-adjustment-latch mechanisms 404 includes a plurality of elastic receptacles 405 at differing relative heights. Each of the plurality of elastic receptacles 405 is configured to grasp the height-adjustment attachment location 402 when the first rack is attached to the second rack and to release the height-adjustment attachment location 402 when the first rack is to be separated from the second rack.

Figure 5:
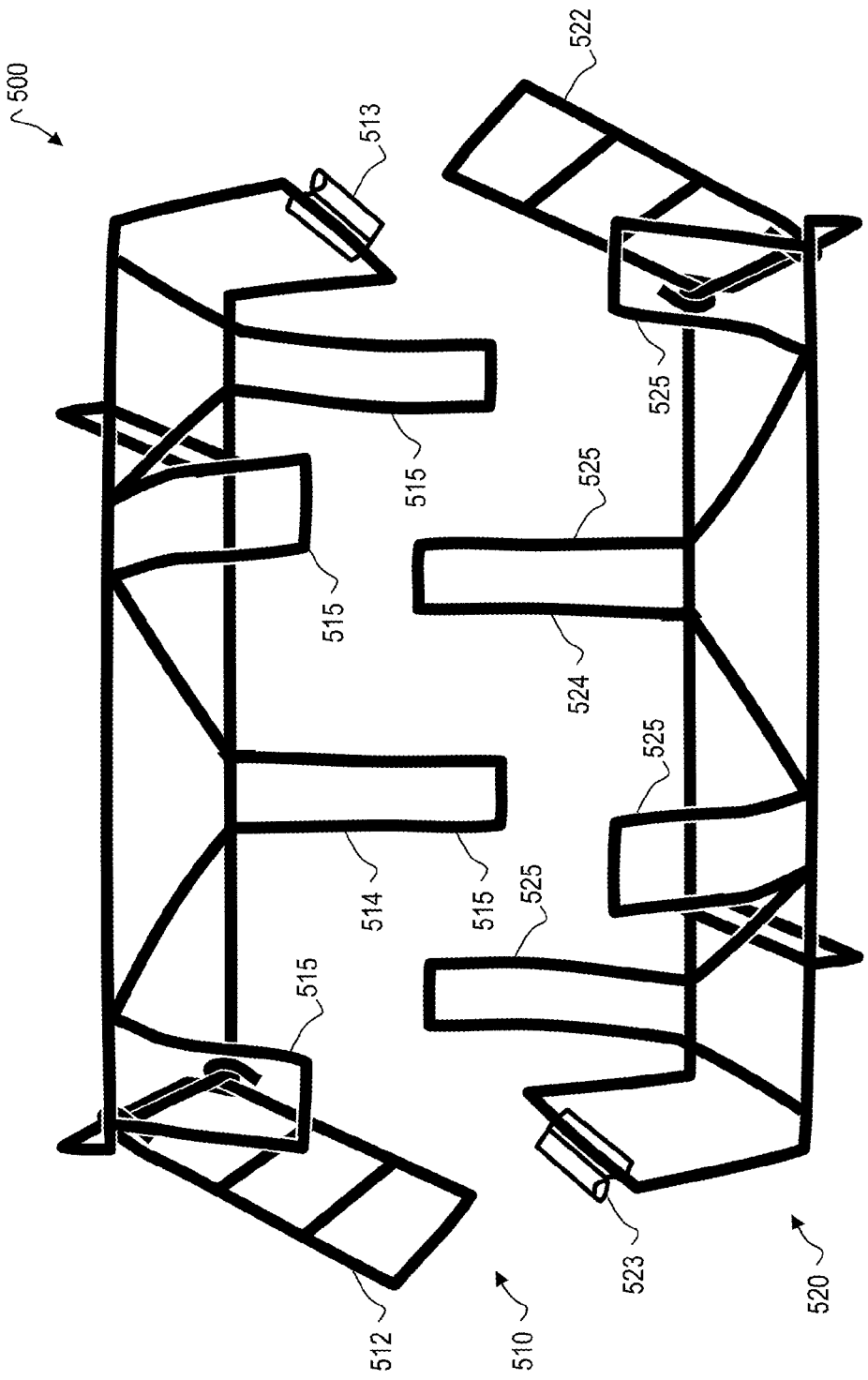
FIG. 5 is a perspective view of a plurality of racks 500 in accordance with some embodiments of the present invention.

FIG. 5 is a perspective view of a plurality of racks 500 in accordance with some embodiments of the present invention. In some embodiments, the first rack 510 and the second rack 520 have substantially identical shapes 500, wherein the first end of each rack includes a height adjusting mechanism 512 and 522 and the second opposite end of each rack includes a snapping latch mechanism 513 and 523, and wherein the latch mechanism 513 of the first rack 510 fastens to and releases from the height adjusting mechanism 522 of the second rack 520, and the latch mechanism 523 of the second rack 520 fastens to and releases from the height adjusting mechanism 512 of the first rack 520. The sides 514 and 524 of the racks 510 and 520 respectively, are configured with a number of loops 515 and 525 and are each formed from a single piece of material. The loops 515, 525 are configured such that they keep a food item in the rack from moving sideways, and they are further configured such that they interlace when the first rack 510 is attached to the second rack 520. This embodiment provides an advantage over other embodiments in that only a single type of rack needs to be manufactured. An additional advantage is that in this embodiment, the sides of a rack are formed from a single piece of material rather than multiple pieces reducing manufacturing costs.

FIG. 6A is a perspective view of a breast rack in accordance with a first embodiment of the present invention. The breast rack can be shaped to cradle a rounded breast side of a turkey or other bird. Furthermore, individual slats, bars or wires of the breast rack can be spaced apart from one another such that the back rack can overlap the breast rack to the extent necessary to securely hold the turkey, bird or roast to be flipped. The handles of the breast rack can engage, lock or latch with the handles of the back rack. In embodiments of the present invention, the individual slats, bars or wires of the breast rack can be rounded bars or wires, or can be solid or open slats.

FIG. 6B is a detail view of a latch mechanism in accordance with a first embodiment of the present invention. The latch mechanism is formed from bent wire and is attached to an end of a rack.

The handles of the breast rack can have a locking, latching or other affixing mechanism that can be used to secure the handles of the breast rack to the handles of a back rack. In embodiments of the present invention, the locking, latching or affixing mechanism is a hook or hooks that snap or hooks onto the handles of the back rack.

Exemplary dimensions of a breast rack are shown in FIG. 6A. For example, the breast rack can be approximately 15 inches (38 cm) in length, 11 inches (28 cm) in width, and 5.5 inches (14 cm) in height. In some embodiments, the handles can be 4.5 inches (11 cm) in height.

It is to be understood that the exact dimensions of the breast rack are not limitations of the present invention. Rather, the dimensions of the breast rack can be of varying sizes to accommodate for example, small, medium or large sized birds or roasts. Each sized breast rack can be adjustable to fit birds within a given size range. In preferred embodiments, the breast rack is of such a size that it fits within a roasting pan. In further preferred embodiments, the handles of the breast rack extend above the sides of the roasting pan when the rack is positioned in the roasting pan during use.

FIG. 7 is a perspective view of a back rack in accordance with a first embodiment the present invention. The back rack can be shaped to hold the back side of a turkey or other bird while allowing for tucked wings and legs. The width of the back rack can be slightly larger than the width of the corresponding breast rack. In this manner, individual slats, bars or wires of the breast rack can fit in between the individual slats, bars or wires of the back rack.

The handles of the back rack can be hinged and adjustable to more easily affix to the handles of the breast rack at a plurality of positions. The handles of the back rack can be formed with cross-sectional bars spaced apart at varying heights on the handles. In this manner, the handles of the breast rack can be affixed to the handles of the back rack at each of the cross-sectional bars. Accordingly, the turkey flipper can accommodate turkeys or birds of varying sizes and diameters.

Exemplary dimensions of a back rack are shown in FIG. 7. For example, the back rack can be approximately 15 inches (38 cm) in length, 11.5 inches (29 cm) in width, and 3.5 inches (9 cm) in height. In some embodiments, the handles can be 5.5 inches (14 cm) in height.

It is to be understood that the exact dimensions of the back rack are not limitations of the present invention. Rather, the dimensions of the back rack can be of varying sizes to accommodate for example, small, medium or large sized birds or roasts. Each sized back rack can be adjustable to fit birds within a given size range. In preferred embodiments, the back rack is of such a size that it fits within a roasting pan. In further preferred embodiments, the back rack handles extend to a higher height than the sides of the roasting pan.

Figure 8:
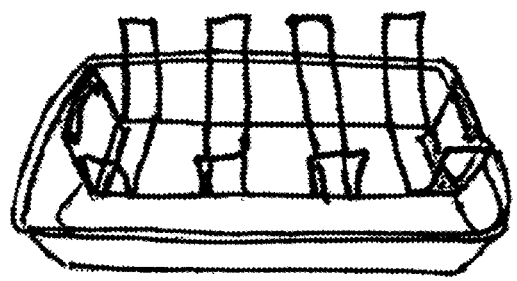
FIG. 8 is a side view of a breast rack in accordance with some embodiments of the present invention positioned in a roasting pan.
Figure 9:
FIG. 9 is a side view of a breast rack in accordance with some embodiments of the present invention positioned in a roasting pan with a turkey situated therein.

FIG. 8, FIG. 9, FIG. 10, FIG. 11, and FIG. 12 illustrate a method of using the turkey rack according the present invention. As seen in FIG. 8, the breast rack can be placed in a roasting pan. FIG. 9 illustrates a turkey being placed in the breast rack with the breast side down.

In embodiments of the claimed invention, the turkey can be cooked or baked in an oven with the breast side down on the breast rack until the turkey is cooked approximately 50-75% of the way to being fully cooked, with it being preferred that the turkey is cooked approximately 75% of the way to being fully cooked. In further embodiments, the turkey can be cooked or baked in an oven with the breast side down on the breast rack until there are approximately 30-60 minutes remaining of the total cooking time.

Figure 10:
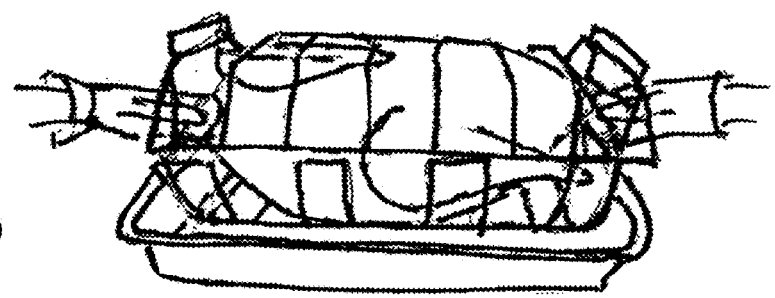
FIG. 10 is a side view of a turkey flipper in accordance with some embodiments of the present invention with a turkey situated therein with the breast side down.

Referring to FIG. 10, the turkey can be removed from the oven, and the back rack can be placed on top of the turkey. The handles of the back rack are hinged and adjustable and can be secured to the handles of the breast rack so that the turkey fits securely therebetween. In alternate embodiments of the present invention, the back rack ban be placed on top of the turkey and secured to the breast rack before the turkey begins cooking.

Figure 11:
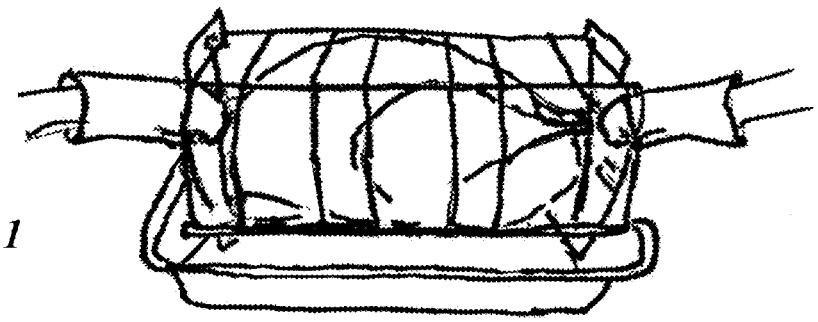
FIG. 11 is a side view of a turkey flipper in accordance with some embodiments of the present invention, with a turkey situated therein with the breast side up.

As seen in FIG. 11, the handles of the breast rack and back rack that are secured together can be gripped by a user. It is preferable to use oven mitts or another heat deflecting mechanism as is known by those of skill in the art when gripping the handles because the handles may be hot from being in the oven.

With one fluid motion, the turkey, breast rack, back rack, and handles can be lifted, flipped, and placed back in the pan. In this manner, the turkey is turned from breast side down to breast side up.

Figure 12:
FIG. 12 is a side view of a back rack in accordance with some embodiments of the present invention in a roasting pan with a turkey situated therein.

Referring to FIG. 12, the handles of the breast rack and the back rack can be unlatched from one another, and the breast rack can be removed from the turkey. Then, the turkey, resting on the back rack with the breast side up can be placed back in the oven for the remainder of its cooking time. In alternate embodiments of the claimed invention, the breast rack can remain on top of the turkey and secured to the back rack while the turkey cooks with the breast side up.

The handles of the breast rack and the back rack can be secured to one another at a plurality of locations. In this manner, the turkey flipper can securely accommodate a turkey of varying sizes, e.g., a medium sized turkey, a small turkey and a large turkey. When the turkey flipper accommodates a turkey of, for example, a medium or small size, the individual slats of the breast rack and the back rack extend in between one another to varying degrees. When the turkey flipper accommodates a turkey of, for example, a large size, the individual slats of the breast rack and back rack can meet at the ends thereof.

FIG. 13A is a perspective view of a plurality of racks 1300 in accordance with some embodiments of the present invention and FIG. 13B is a side view of a height-adjustment-latch mechanism. In such embodiments the first rack 1310 is attached to the second rack 1320 with a plurality of connectors 1311, wherein the connectors 1311 attach an edge of the first rack 1312 with a plurality of frames 1324 of the second rack such that the first rack and the second rack are free rotate along a long side. In some embodiments, the connectors 1311 permit the first rack to be separated from the second rack. The second rack 1320 includes a height-adjustment-latch mechanism 1323 wherein the height-adjustment-latch mechanism rotates about a long axis of the second rack 1321 at a plurality of points 1325. In such embodiments, the height-adjustment-latch mechanism 1323 includes a plurality of elastic receptacles 1326. Each of the plurality of elastic receptacles 1326 is configured to grasp the long side of the first rack 1314 when the first rack is attached to the second rack and to release the long side of the first rack 1314 when the first rack is to be separated from the second rack.

In some embodiments, the present invention provides an apparatus that includes a plurality of racks including a first rack and a second rack, wherein the plurality of racks are configured to releasably attach to one another and to surround a food item during a manual inversion operation of the food item between a first cooking period and a second cooking period, wherein each one of the plurality of racks has a first end and an opposite second end, and wherein the first rack includes: a plurality of handles including a first handle on the first end of the first rack and a second handle on the second end of the first rack, and wherein the plurality of handles are configured to be manually grasped during the manual inversion of the food item, a first height-adjustment mechanism attached to the first rack and configured to set a spacing between the first rack and the second rack such that the spacing is adjustable to hold food items of various sizes, and a plurality of feet including a first foot and a second foot on the first rack, wherein the plurality of feet are configured to keep the food item being cooked raised above a bottom of a cooking container during at least one of the first and the second cooking period; and a first latch mechanism configured to releasably latch the second rack to the first height-adjustment mechanism of the first rack for at least a duration of the manual inversion operation, wherein the first latch mechanism is also configured to release the plurality of racks from one another.

In some embodiments, the present invention provides an apparatus that includes a plurality of height-adjustment mechanisms including the first height-adjustment mechanism attached to the first end of the first rack and a second height-adjustment mechanism attached to the second end of the first rack, wherein each of the height-adjustment mechanisms is configured with a plurality of attachment points and each one of the plurality of height-adjustment mechanisms rotates about a transverse horizontal axis. In some such embodiments, the first foot is transversely oriented at the first end of the first rack and the second foot is transversely oriented at the second end of the first rack, and the first height-adjustment mechanism serves as the first handle for the first end of the first rack and the second height-adjustment mechanism serves as the second handle for the second end of the first rack. Further, in some such embodiments, the first rack is fabricated using a wire frame that is bent and welded to itself into its shape, wherein the shape includes a plurality of sides including a bottom, a first side and a second side, wherein each side is substantially planar, each side has a long axis and a short axis that is perpendicular to the side's long axis, and each is characterized by a geometric plane passing through the wires of that side, each side is substantially rectangular in shape, with the long axes of each of the rectangles substantially parallel and configured with the plane of the first side at a first obtuse angle to the bottom and the plane of the second side at a second obtuse angle to the bottom. In some such embodiments, the second rack includes: a plurality of latch mechanisms including the first latch mechanism and a second latch mechanism, wherein the first latch mechanism is attached to the first end of the second rack, and the second latch mechanism is attached to the second end of the second rack, wherein each of the plurality of latch mechanisms includes an elastic receptacle that is configured to grasp one or more of the plurality of attachment points on the height-adjustment mechanism on the corresponding end of the first rack when the first rack is attached to the second rack and to release the attachment point when the first rack is separated from the second rack. The second rack further includes a plurality of feet including a first foot transversely oriented and located substantially closer to the first end of the second rack than to the second end of the second rack, and a second foot transversely oriented at the second end of the second rack and located substantially closer to the second end of the second rack than to the first end of the second rack. In some such embodiments, the first latch mechanism of the second rack serves as a handle for the first end of the second rack and the second latch mechanism of the second rack serves as a handle for the second end of the second rack. In some such embodiments, the second rack is fabricated using a wire frame that is bent and welded to itself into its shape wherein the rack includes a base in a substantially rectangular shape and a plurality of frames including a first frame and a second frame wherein each frame is configured in a convex shape and is attached to the base, oriented with the axis of curvature substantially parallel to the long axis of the base.

In some embodiments, the first rack includes: a plurality of height-adjustment mechanisms including the first height-adjustment mechanism attached to the first end of the first rack and a second height-adjustment mechanism attached to the second end of the first rack wherein each one of the plurality of height-adjustment mechanisms rotates about a transverse horizontal axis and is configured with a plurality of attachment points, wherein the first foot is transversely oriented at the first end of the first rack and the second foot is transversely oriented at the second end of the first rack, and wherein the first height-adjustment mechanism serves as the first handle for the first end of the first rack and the second height-adjustment mechanism serves as the second handle for the second end of the first rack; and the second rack includes: a plurality of latch mechanisms including the first latch mechanism and a second latch mechanism, wherein the first latch mechanism is attached to the first end of the second rack, and the second latch mechanism is attached to the second end of the second rack, wherein each of the plurality of latch mechanisms includes an elastic receptacle that is configured to grasp one or more of the plurality of attachment points on the height-adjustment mechanism on the corresponding end of the first rack when the first rack is attached to the second rack and to release the attachment point when the first rack is separated from the second rack, a plurality of feet including a first foot transversely oriented and located substantially closer to the first end of the second rack than to the center of the long axis of the second rack, and a second foot transversely oriented at the second end of the second rack and located substantially closer to the second end of the second rack than to the center of the long axis of the second rack, and wherein the first latch mechanism serves as a handle for the first end of the second rack and the second latch serves as a handle for the second end of the second rack.

In some embodiments, the second rack includes a plurality of latch mechanisms including the first latch mechanism and a second latch mechanism, wherein the first latch mechanism is attached to the first end of the second rack, and the second latch mechanism is attached to the opposite second end of the second rack, wherein each of the plurality of latch mechanisms is a spring latch mechanism wherein the spring latch mechanism includes: a substantially non-elastic receptacle that is configured to receive and contain one or more of the plurality of attachment points on the first height-adjustment mechanism of the first rack, and a spring configured to allow the one or more of the plurality of attachment points on the height-adjustment mechanism to enter the receptacle and to hold the attachment point within the receptacle, and further to release the attachment point when sufficient pressure is manually applied to the spring.

In some embodiments, the first rack and the second rack have substantially identical shapes, wherein the first end of each rack includes a height adjusting mechanism and the second opposite end of each rack includes a snapping latch mechanism, and wherein the latch mechanism of the first rack fastens to and releases from the height adjusting mechanism of the second rack, and the latch mechanism of the second rack fastens to and releases from the height adjusting mechanism of the first rack.

In some embodiments, the present invention provides an apparatus that includes: a plurality of racks including a first rack and a second rack, wherein the plurality of racks are configured to releasably attach to one another and to surround a food item during a manual inversion operation of the food item between a first cooking period and a second cooking period, wherein each one of the plurality of racks has a first end and an opposite second end. The first rack includes: a plurality of handles including a first handle on the first end of the first rack and a second handle on the second end of the first rack, and wherein the plurality of handles are configured to be manually grasped during the manual inversion of the food item, a first height-adjustment mechanism attached to the first rack and configured to set a spacing between the first rack and the second rack such that the spacing is adjustable to hold food items of various sizes, and a plurality of feet including a first foot and a second foot on the first rack, wherein the plurality of feet are configured to hold the food item being cooked raised above a bottom of a cooking container during at least one of the first and the second cooking period; and a first latch mechanism configured to releasably latch the second rack to the first height-adjustment mechanism of the first rack for at least a duration of the manual inversion operation, wherein the first latch mechanism is also configured to release the plurality of racks from one another.

In some embodiments, the first rack includes: a plurality of height-adjustment mechanisms including the first height-adjustment mechanism attached to the first end of the first rack and a second height-adjustment mechanism attached to the second end of the first rack, wherein each of the height-adjustment mechanisms is configured with a plurality of attachment locations including a first attachment location and second attachment location, and wherein each one of the plurality of height-adjustment mechanisms rotates about a transverse horizontal axis. In some such embodiments, the first foot of the first rack is transversely oriented at the first end of the first rack and the second foot of the first rack is transversely oriented at the second end of the first rack, the first height-adjustment mechanism serves as the first handle for the first end of the first rack and the second height-adjustment mechanism serves as the second handle for the second end of the first rack, and the first rack is fabricated using a wire frame that is bent and welded to itself into its shape, wherein the shape includes a plurality of sides including a bottom, a first side and a second side, wherein each side is substantially planar, each side has a long axis and a short axis that is perpendicular to the side's long axis, and each is characterized by a geometric plane passing through the wires of that side, with the long axes of each of the side substantially parallel and configured with the plane of the first side at a first obtuse angle to the bottom and the plane of the second side at a second obtuse angle to the bottom. In some such embodiments, the second rack includes: a plurality of latch mechanisms including the first latch mechanism and a second latch mechanism, wherein the first latch mechanism is attached to the first end of the second rack, and the second latch mechanism is attached to the second end of the second rack, wherein each of the plurality of latch mechanisms includes an elastic receptacle that is configured to grasp one or more of the plurality of attachment points on the height-adjustment mechanism on the corresponding end of the first rack when the first rack is attached to the second rack and to release the attachment point when the first rack is separated from the second rack, a plurality of feet including a first foot transversely oriented and located substantially closer to the first end of the second rack than to the second end of the second rack, and a second foot transversely oriented at the second end of the second rack and located substantially closer to the second end of the second rack than to the first end of the second rack, wherein the first latch mechanism serves as a handle for the first end of the second rack and the second latch mechanism serves as a handle for the second end of the second rack, and wherein the second rack is fabricated using a wire frame that is bent and welded to itself into its shape wherein the rack includes a base and a plurality of frames including a first frame and a second frame wherein each frame is configured in a convex shape and is attached to the base, oriented with the axis of curvature substantially parallel to the long axis of the base.

In some embodiments of the apparatus, the first rack is fabricated using a wire frame that is bent and welded to itself into its shape.

In some embodiments of the apparatus, the first rack includes: a plurality of height-adjustment mechanisms including the first height-adjustment mechanism attached to the first end of the first rack and a second height-adjustment mechanism attached to the second end of the first rack wherein each one of the plurality of height-adjustment mechanisms rotates about a transverse horizontal axis and is configured with a plurality of attachment points, a plurality of feet including a first foot and a second foot wherein the first foot is transversely oriented at the first end of the first rack and the second foot is transversely oriented at the second end of the first rack, wherein the first height-adjustment mechanism serves as the first handle for the first end of the first rack and the second height-adjustment mechanism serves as the second handle for the second end of the first rack; and wherein the second rack includes: a plurality of latch mechanisms including the first latch mechanism and a second latch mechanism, wherein the first latch mechanism is attached to the first end of the second rack, and the second latch mechanism is attached to the second end of the second rack, wherein each of the plurality of latch mechanisms includes an elastic receptacle that is configured to grasp one or more of the plurality of attachment points on the height-adjustment mechanism on the corresponding end of the first rack when the first rack is attached to the second rack and to release the attachment point when the first rack is separated from the second rack, a plurality of feet including a first foot transversely oriented and located substantially closer to the first end of the second rack than to the center of the long axis of the second rack, and a second foot transversely oriented at the second end of the second rack and located substantially closer to the second end of the second rack than to the center of the long axis of the second rack, and wherein the first latch mechanism serves as a handle for the first end of the second rack and the second latch mechanism serves as a handle for the second end of the second rack.

In some embodiments of the apparatus, the second rack is more convex than the first rack such that the first rack is usable as a back rack shaped to better conform to a back side of a turkey and the second rack is usable as a breast rack shaped to better conform to a breast side of the turkey.

In some embodiments of the apparatus, the second rack includes a plurality of latch mechanisms including the first latch mechanism and a second latch mechanism, wherein the first latch mechanism is attached to the first end of the second rack, and the second latch mechanism is attached to the second end of the second rack, wherein each of the plurality of latch mechanisms is a spring latch mechanism wherein the spring latch mechanism includes: a substantially non-elastic receptacle that is configured to receive and contain one or more of the plurality of attachment points on the first height-adjustment mechanism of the first rack, and a spring configured to allow the one or more of the plurality of attachment points on the height-adjustment mechanism to enter the receptacle and to hold the attachment point within the receptacle, and further to release the attachment point when sufficient pressure is manually applied to the spring.

In some embodiments of the apparatus, the first rack includes a plurality of height-adjustment attachment locations including a first height adjustment attachment location on the first end of the first rack and a second height-adjustment attachment location on the second end of the first rack, and wherein the first height-adjustment attachment location serves as the first handle of the first rack and the second height-adjustment attachment location serves as the second handle of the first rack; the second rack includes a plurality of height-adjustment-latch mechanisms including a first height-adjustment-latch-mechanism and a second height-adjustment-latch mechanism, wherein the first height-adjustment-latch mechanism is attached to the first end of the second rack, and the second height-adjustment-latch mechanism is attached to the second end of the second rack, wherein each one of the plurality of height-adjustment-latch mechanisms rotates about a transverse horizontal axis, wherein each of the plurality of height-adjustment-latch mechanisms includes a plurality of elastic receptacles including a first elastic receptacle at a first relative height and a second elastic receptacle at a second relative height, wherein each of the plurality of elastic receptacles is configured to grasp the height-adjustment attachment location on the corresponding end of the first rack when the first rack is attached to the second rack and to release the height-adjustment attachment location when the first rack is to be separated from the second rack, and wherein the first height-adjustment-latch mechanism serves as a first handle of the second rack and the second height-adjustment-latch mechanism serves as a second handle of the second rack.

In some embodiments of the apparatus, the first rack and the second rack have substantially identical shapes, wherein the first end of each rack includes a height adjusting mechanism and the second opposite end of each rack includes a snapping latch mechanism, and wherein the latch mechanism of the first rack fastens to and releases from the height adjusting mechanism of the second rack, and the latch mechanism of the second rack fastens to and releases from the height adjusting mechanism of the first rack.

In some embodiments, the present invention provides a method that includes providing a plurality of racks including a first rack and a second rack, wherein the plurality of racks are configured to releasably attach to one another and to surround a food item during a manual inversion operation of the food item between a first cooking period and a second cooking period, wherein each one of the plurality of racks has a first end and an opposite second end, and wherein the providing of the first rack includes: forming a plurality of handles including a first handle on the first end of the first rack and a second handle on the second end of the first rack, and wherein the plurality of handles are configured to be manually grasped during the manual inversion of the food item. The method further includes attaching a first height-adjustment mechanism to the first rack and configuring the first height mechanism to set a spacing between the first rack and the second rack such that the spacing is adjustable to hold food items of various sizes, and forming a plurality of feet including a first foot and a second foot on the first rack, wherein the plurality of feet are configured to keep the food item being cooked raised above a bottom of a cooking container during at least one of the first and the second cooking period; and providing a first latch mechanism and configuring the first latch mechanism to releasably latch the second rack to the first height-adjustment mechanism of the first rack for at least a duration of the manual inversion operation, and configuring the first latch mechanism to release the plurality of racks from one another.

Some embodiments further include providing a plurality of height-adjustment mechanisms including the first height-adjustment mechanism attached to the first end of the first rack and a second height-adjustment mechanism attached to the second end of the first rack, wherein each of the height-adjustment mechanisms is configured with a plurality of attachment locations including a first attachment location and second attachment location, and wherein each one of the plurality of height-adjustment mechanisms rotates about a transverse horizontal axis. These embodiments also further include fabricating the first rack using a wire frame that is bent and welded to itself into its shape wherein the shape includes a plurality of sides including a bottom, a first side and a second side, wherein each side is substantially planar, each side has a long axis and a short axis that is perpendicular to the side's long axis, and each is characterized by a geometric plane passing through the wires of that side, with the long axes of each of the side substantially parallel and configured with the plane of the first side at a first obtuse angle to the bottom and the plane of the second side at a second obtuse angle to the bottom; and wherein the first foot is transversely oriented at the first end of the first rack and the second foot is transversely oriented at the second end of the first rack, and wherein the first height-adjustment mechanism serves as the first handle for the first end of the first rack and the second height-adjustment mechanism serves as the second handle for the second end of the first rack. In these embodiments the providing of the second rack includes: providing a plurality of latch mechanisms including the first latch mechanism and a second latch mechanism, wherein the first latch mechanism is attached to the first end of the second rack, and the second latch mechanism is attached to the second end of the second rack, wherein each of the plurality of latch mechanisms includes an elastic receptacle that is configured to grasp one or more of the plurality of attachment points on the height-adjustment mechanism on the corresponding end of the first rack when the first rack is attached to the second rack and to release the attachment point when the first rack is separated from the second rack, forming a plurality of feet including a first foot of the second rack transversely oriented and located substantially closer to the first end of the second rack than to the second end of the second rack, and a second foot of the second rack transversely oriented at the second end of the second rack and located substantially closer to the second end of the second rack than to the first end of the second rack. In some such embodiments, the first latch mechanism serves as a handle for the first end of the second rack and the second latch mechanism serves as a handle for the second end of the second rack. This method further includes fabricating the second rack using a wire frame that is bent and welded to itself into its shape wherein the rack includes a base and a plurality of frames including a first frame and a second frame wherein each frame is configured in a convex shape and is attached to the base, oriented with the axis of curvature substantially parallel to the long axis of the base.

Some embodiments further include fabricating the first rack using a wire frame that is bent and welded to itself into its shape.

In some embodiments, the providing of the first rack further includes: providing a plurality of height-adjustment mechanisms including the first height-adjustment mechanism attached to the first end of the first rack and a second height-adjustment mechanism attached to the second end of the first rack wherein each one of the plurality of height-adjustment mechanisms rotates about a transverse horizontal axis and is configured with a plurality of attachment points, wherein the first foot is transversely oriented at the first end of the first rack and the second foot is transversely oriented at the second end of the first rack, and wherein the first height-adjustment mechanism serves as the first handle for the first end of the first rack and the second height-adjustment mechanism serves as the second handle for the second end of the first rack. In some such embodiments, the providing of the second rack further includes: providing a plurality of latch mechanisms including the first latch mechanism and a second latch mechanism, wherein the first latch mechanism is attached to the first end of the second rack, and the second latch mechanism is attached to the second end of the second rack, wherein each of the plurality of latch mechanisms includes an elastic receptacle that is configured to grasp one or more of the plurality of attachment points on the height-adjustment mechanism on the corresponding end of the first rack when the first rack is attached to the second rack and to release the attachment point when the first rack is separated from the second rack, providing a plurality of feet including a first foot transversely oriented and located substantially closer to the first end of the second rack than to the center of the long axis of the second rack, and a second foot transversely oriented at the second end of the second rack and located substantially closer to the second end of the second rack than to the center of the long axis of the second rack, and wherein the first latch mechanism serves as a handle for the first end of the second rack and the second latch mechanism serves as a handle for the second end of the second rack.

In some embodiments, the second rack is configured more convex than the first rack such that the first rack is usable as a back rack shaped to better conform to a back side of a turkey and the second rack is usable as a breast rack shaped to better conform to a breast side of the turkey.

In some embodiments, the providing of the second rack further includes providing a plurality of latch mechanisms including the first latch mechanism and a second latch mechanism, wherein the first latch mechanism is attached to the first end of the second rack, and the second latch mechanism is attached to the second end of the second rack, wherein each of the plurality of latch mechanisms is a spring latch mechanism, and wherein providing the spring latch mechanism includes providing a substantially non-elastic receptacle that is configured to receive and contain one or more of the plurality of attachment points on the first height-adjustment mechanism of the first rack, and providing a spring configured to allow the one or more of the plurality of attachment points on the height-adjustment mechanism to enter the receptacle and to hold the attachment point within the receptacle, and further to release the attachment point when sufficient pressure is manually applied to the spring.

In some embodiments, the providing of the first rack further includes providing a plurality of height-adjustment attachment locations including a first height adjustment attachment location on the first end of the first rack and a second height-adjustment attachment location on the second end of the first rack, and wherein the first height-adjustment attachment location serves as the first handle of the first rack and the second height-adjustment attachment location serves as the second handle of the first rack. In some such embodiments, the providing of the second rack further includes providing a plurality of height-adjustment-latch mechanisms including a first height-adjustment-latch-mechanism and a second height-adjustment-latch mechanism, wherein the first height-adjustment-latch mechanism is attached to the first end of the second rack, and the second height-adjustment-latch mechanism is attached to the second end of the second rack, wherein each one of the plurality of height-adjustment-latch mechanisms rotates about a transverse horizontal axis, wherein each of the plurality of height-adjustment-latch mechanisms includes a plurality of elastic receptacles including a first elastic receptacle at a first relative height and a second elastic receptacle at a second relative height, wherein each of the plurality of elastic receptacles is configured to grasp the height-adjustment attachment location on the corresponding end of the first rack when the first rack is attached to the second rack and to release the height-adjustment attachment location when the first rack is to be separated from the second rack, and wherein the first height-adjustment-latch mechanism serves as a first handle of the second rack and the second height-adjustment-latch mechanism serves as a second handle of the second rack.

In some embodiments, the providing of the first rack and of the second rack configuring the first rack and the second rack with substantially identical shapes, wherein the first end of each rack includes a height adjusting mechanism, and the second opposite end of each rack includes a snapping latch mechanism, and wherein the latch mechanism of the first rack fastens to and releases from the height adjusting mechanism of the second rack, and the latch mechanism of the second rack fastens to and releases from the height adjusting mechanism of the first rack.

Another aspect of the present invention includes a kit having a pan; a plurality of racks including a first rack and a second rack, wherein the plurality of racks are configured to releasably attach to one another and to surround a food item during a manual inversion operation of the food item between a first cooking period and a second cooking period, wherein each one of the plurality of racks has a first end and an opposite second end. The first rack includes a plurality of handles including a first handle on the first end of the first rack and a second handle on the second end of the first rack, and wherein the plurality of handles are configured to be manually grasped during the manual inversion of the food item, a first height-adjustment mechanism attached to the first rack and configured to set a spacing between the first rack and the second rack such that the spacing is adjustable to hold food items of various sizes, and a plurality of feet including a first foot and a second foot on the first rack, wherein the plurality of feet are configured to keep the food item being cooked raised above a bottom of a cooking container during at least one of the first and the second cooking period. The first rack also includes a first latch mechanism configured to releasably latch the second rack to the first height-adjustment mechanism of the first rack for at least a duration of the manual inversion operation, wherein the first latch mechanism is also configured to release the plurality of racks from one another. The racks are configured to rest on their feet on the bottom on the pan.

In some other embodiments, the kit consists of the first rack which includes a plurality of height-adjustment mechanisms including the first height-adjustment mechanism attached to the first end of the first rack and a second height-adjustment mechanism attached to the second end of the first rack, wherein each of the height-adjustment mechanisms is configured with a plurality of attachment locations including a first attachment location and second attachment location, and wherein each one of the plurality of height-adjustment mechanisms rotates about a transverse horizontal axis. In some such embodiments, the first foot of the first rack is transversely oriented at the first end of the first rack and the second foot of the first rack is transversely oriented at the second end of the first rack, the first height-adjustment mechanism serves as the first handle for the first end of the first rack and the second height-adjustment mechanism serves as the second handle for the second end of the first rack, and the first rack is fabricated using a wire frame that is bent and welded to itself into its shape, wherein the shape includes a plurality of sides including a bottom, a first side and a second side (in some embodiments, each side is substantially planar and each is characterized by a geometric plane passing through the wires of that side), with the long axes of each of the side substantially parallel and configured with the plane of the first side at a first obtuse angle to the bottom and the plane of the second side at a second obtuse angle to the bottom. The kit further consists of the second rack which includes a plurality of latch mechanisms including the first latch mechanism and a second latch mechanism, wherein the first latch mechanism is attached to the first end of the second rack, and the second latch mechanism is attached to the second end of the second rack, wherein each of the plurality of latch mechanisms includes an elastic receptacle that is configured to grasp one or more of the plurality of attachment points on the height-adjustment mechanism on the corresponding end of the first rack when the first rack is attached to the second rack and to release the attachment point when the first rack is separated from the second rack, a plurality of feet including a first foot transversely oriented and located substantially closer to the first end of the second rack than to the second end of the second rack, and a second foot transversely oriented at the second end of the second rack and located substantially closer to the second end of the second rack than to the first end of the second rack, wherein the first latch mechanism serves as a handle for the first end of the second rack and the second latch mechanism serves as a handle for the second end of the second rack, and wherein the second rack is fabricated using a wire frame that is bent and welded to itself into its shape wherein the rack includes a base and a plurality of frames including a first frame and a second frame wherein each frame is configured in a convex shape and is attached to the base, oriented with the axis of curvature substantially parallel to the long axis of the base.

In other embodiments of the kit, the first rack is fabricated using a wire frame that is bent and welded to itself into its shape.

In some embodiments of the kit, the first rack includes a plurality of height-adjustment mechanisms including the first height-adjustment mechanism attached to the first end of the first rack and a second height-adjustment mechanism attached to the second end of the first rack wherein each one of the plurality of height-adjustment mechanisms rotates about a transverse horizontal axis and is configured with a plurality of attachment points, a plurality of feet including a first foot and a second foot wherein the first foot is transversely oriented at the first end of the first rack and the second foot is transversely oriented at the second end of the first rack, wherein the first height-adjustment mechanism serves as the first handle for the first end of the first rack and the second height-adjustment mechanism serves as the second handle for the second end of the first rack. The kit further includes the second rack which includes a plurality of latch mechanisms including the first latch mechanism and a second latch mechanism, wherein the first latch mechanism is attached to the first end of the second rack, and the second latch mechanism is attached to the second end of the second rack, wherein each of the plurality of latch mechanisms includes an elastic receptacle that is configured to grasp one or more of the plurality of attachment points on the height-adjustment mechanism on the corresponding end of the first rack when the first rack is attached to the second rack and to release the attachment point when the first rack is separated from the second rack, a plurality of feet including a first foot transversely oriented and located substantially closer to the first end of the second rack than to the center of the long axis of the second rack, and a second foot transversely oriented at the second end of the second rack and located substantially closer to the second end of the second rack than to the center of the long axis of the second rack, and wherein the first latch mechanism serves as a handle for the first end of the second rack and the second latch mechanism serves as a handle for the second end of the second rack.

In some embodiments, the present invention provides a back rack that accommodates a back side of the bird; breast rack handles at each end of the breast rack that extend in an upward direction from the breast rack, each breast rack handle including an attaching mechanism; and back rack handles at each end of the back rack that extend in an upward direction from the back rack, each back rack handle including a plurality of receiving mechanisms located at a plurality of different positions for receiving the attaching mechanism.

In other embodiments, the present invention provides a method of cooking a turkey or other bird breast side down and flipping it before the end of the cooking time that includes: placing the first side of a roasting rack configured to hold the breast of said bird and having handles located on the ends of first part of said roasting rack in a roasting pan; placing said bird onto said first side of said roasting rack breast side down and placing said pan into an oven set a temperature appropriate for cooking said bird; removing said pan with said first part of the roasting rack with said bird from the oven when bird has cooked to within a predetermined range of doneness; placing a second part of said roasting rack with handles located on the ends of said second part of the roasting rack over the back of said bird, and allowing the sides of said first and second parts of the roasting rack to overlap as necessary to allow said second part of the roasting rack to sit on the back of said bird. The method further includes: locking the handles of said first and second parts of the roasting rack together; grasping the locked handles of the roasting rack and flipping the roasting rack with the bird secured therein over so the breast of the bird is now facing up; placing the roasting rack with the bird secured therein back in the roasting pan with the second part of the roasting rack in the pan, the breast of the bird facing up; unlocking the handles of the roasting rack and removing the first part of the roasting rack from the bird; putting the roasting pan with the roasting rack and bird therein back into the oven; and allowing the bird to finish cooking.

From the foregoing, it will be observed that numerous variations and modifications may be effected without departing from the spirit and scope of the invention. It is to be understood that no limitation with respect to the specific apparatus or method illustrated herein is intended or should be inferred. It is, of course, intended to cover by the appended claims all such modifications as fall within the scope of the claims.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical or sequential requirements on their objects.

What is claimed is:

1. An apparatus comprising:
    a plurality of racks including a first rack and a second rack, wherein the plurality of racks are configured to releasably attach to one another and to surround a food item during a manual inversion operation of the food item between a first cooking period and a second cooking period, wherein each one of the plurality of racks has a first end and an opposite second end, and wherein the first rack includes:
        a plurality of handles including a first handle on the first end of the first rack and a second handle on the second end of the first rack, wherein the plurality of handles are configured to be manually grasped during the manual inversion of the food item, and wherein the first handle includes a first height-adjustment mechanism that has a plurality of attachment points that attach to the second rack and are configured to set a spacing between the first rack and the second rack such that the spacing is adjustable to hold food items of various sizes, and
        a first plurality of feet including a first foot and a second foot on the first rack, wherein the first plurality of feet are configured to keep the food item being cooked raised above a bottom of a cooking container during at least one of the first and the second cooking period, wherein each one of the plurality of attachment points of the first height-adjustment mechanism is located on a different horizontal plane through the first rack when the first rack is in an upright position; and
    wherein the second rack includes:
        a plurality of handles including a third handle on the first end of the second rack and a fourth handle on the second end of the second rack, wherein the third handle includes a first latch connector formed from flat spring steel and affixed to the third handle and configured to releasably connect to a first attachment point selected from the plurality of attachment points on the first height-adjustment mechanism of the first rack when the first rack is attached to the second rack and to release the first attachment point when the first rack is separated from the second rack, and
        a second plurality of feet including a third foot and a fourth foot on the second rack, wherein the second plurality of feet are configured to keep the food item being cooked raised above a bottom of a cooking container during at least one of the first and the second cooking period,
    and wherein one of the second handle and the fourth handle includes a second height-adjustment mechanism, wherein the second height-adjustment mechanism includes a plurality of attachment points that attach to the second rack and wherein the other one of the fourth handle and the second handle includes a second latch connector formed from flat spring steel and affixed to the other one of the fourth handle and the second handle and configured to releasably connect to a second attachment point selected from the plurality of attachment points on the second height-adjustment mechanism when the first rack is attached to the second rack and to release the second attachment point when the first rack is separated from the second rack.

2. The apparatus of claim 1,
    wherein each of the first and second handles rotates about a transverse horizontal axis,
        wherein the first foot of the first rack is transversely oriented at the first end of the first rack and the second foot of the first rack is transversely oriented at the second end of the first rack,
        wherein the first rack includes a wire frame that has a shape, wherein the shape includes a plurality of sides including a bottom, a first side and a second side, wherein each side is planar, each side has a long axis and a short axis that is perpendicular to the side's long axis, and each side is characterized by a geometric plane passing through the wires of that side, with the long axes of the sides parallel to each other, and wherein the plane of the first side is at a first obtuse angle to the bottom and the plane of the second side is at a second obtuse angle to the bottom;

wherein the first connector and the second connector each includes an elastic receptacle, wherein the third foot of the second rack is transversely oriented and located closer to the first end of the second rack than to the second end of the second rack, and the fourth foot of the second rack is transversely oriented at the second end of the second rack and located closer to the second end of the second rack than to the first end of the second rack, wherein the second rack includes a base with a long axis and a short axis, and a plurality of frames including a first frame and a second frame, and wherein each of the plurality of frames is configured in a convex shape and is attached to the base, oriented with an axis of curvature parallel to the long axis of the base.

3. The apparatus of claim 1, wherein the first rack includes a wire frame, and wherein the wire frame includes a plurality of wires that is bent.

4. The apparatus of claim 1,
wherein each of the first and fourth handles rotates about a transverse horizontal axis and
wherein the first connector and the second connector each includes an elastic receptacle.

5. The apparatus of claim 1, wherein:
the second rack is more convex than the first rack such that the first rack is usable as a back rack shaped to better conform to a back side of a turkey and the second rack is usable as a breast rack shaped to better conform to a breast side of the turkey.

6. The apparatus of claim 1, wherein the first connector and the second connector each includes:
a non-elastic receptacle that is configured to receive and contain one or more of the plurality of attachment points on the first height-adjustment mechanism of the first rack, and
a spring configured to allow the one or more of the plurality of attachment points on the height-adjustment mechanism to enter the receptacle and to hold the attachment point within the receptacle, and further to release the attachment point when sufficient pressure is manually applied to the spring.

7. The apparatus of claim 1, wherein:
the second handle of the first rack includes the second height-adjustment mechanism that has a plurality of attachment points that attach to the second rack.

8. The apparatus of claim 1, wherein:
the first rack and the second rack have identical shapes, wherein the fourth handle includes the second height adjusting mechanism and the second handle of the first rack includes the second connector, and wherein the second connector fastens to and releases from the second height adjusting mechanism of the fourth handle on the second rack, and the first connector of the third handle of the second rack fastens to and releases from the first height adjusting mechanism of the first handle of the first rack.

9. A kit comprising:
a pan;
a plurality of racks including a first rack and a second rack, wherein the plurality of racks are configured to releasably attach to one another and to surround a food item during a manual inversion operation of the food item between a first cooking period and a second cooking period, wherein each one of the plurality of racks has a first end and an opposite second end, and wherein the first rack includes:
a plurality of handles including a first handle on the first end of the first rack and a second handle on the second end of the first rack, wherein the plurality of handles are configured to be manually grasped during the manual inversion of the food item, and wherein the first handle includes a first height-adjustment mechanism and the second handle includes a second height-adjustment mechanism, wherein each of the first and second height-adjustment mechanisms includes a plurality of attachment points that attach to the second rack and are configured to set a spacing between the first rack and the second rack such that the spacing is adjustable to hold food items of various sizes, and
a first plurality of feet including a first foot and a second foot on the first rack, wherein the first plurality of feet are configured to keep the food item being cooked raised above a bottom of a cooking container during at least one of the first and the second cooking period, wherein each one of the plurality of attachment points of the first height-adjustment mechanism is located on a different horizontal plane through the first rack when the first rack is in an upright position;

and wherein the second rack includes:
a plurality of handles including a third handle on the first end of the second rack and a fourth handle on the second end of the second rack, wherein the third handle includes a first latch connector formed from flat spring steel and affixed to the third handle and configured to grasp a first attachment point selected from the plurality of attachment points on the first height-adjustment mechanism of the first rack when the first rack is attached to the second rack and to release the first attachment point when the first rack is separated from the second rack, and wherein the fourth handle includes a second latch connector formed from flat spring steel and affixed to the fourth handle and configured to grasp a second attachment point selected from the plurality of attachment points on the second height-adjustment mechanism of the first rack when the first rack is attached to the second rack and to release the second attachment point when the first rack is separated from the second rack, and
a second plurality of feet including a third foot and a fourth foot on the second rack, wherein the second plurality of feet are configured to keep the food item being cooked raised above a bottom of a cooking container during at least one of the first and the second cooking period.

10. The kit of claim 9,
wherein each one of the plurality of handles on the first rack rotates about a transverse horizontal axis,
wherein the first foot of the first rack is transversely oriented at the first end of the first rack and the second foot of the first rack is transversely oriented at the second end of the first rack,
wherein the first rack includes a wire frame that has a shape, wherein the shape includes a plurality of sides including a bottom, a first side and a second side, wherein each side is planar, each side has a long axis and a short axis that is perpendicular to the side's long axis, and each side is characterized by a geometric plane passing through the wires of that side, with the long axes of the sides parallel to each other, and wherein the plane of the first side is at a first obtuse angle to the bottom and the plane of the second side is at a second obtuse angle to the bottom;

wherein the first connector and the second connector each includes an elastic receptacle, wherein the third foot of the second rack is transversely oriented and located closer to the first end of the second rack than to the second end of the second rack, and the fourth foot of the second rack is transversely oriented at the second end of the second rack and located closer to the second end of the second rack than to the first end of the second rack, wherein the second rack includes a base with a long axis and a short axis, and a plurality of frames including a first frame and a second frame, and wherein each of the plurality of frames is configured in a convex shape and is attached to the base, oriented with an axis of curvature parallel to the long axis of the base.

11. The kit of claim 9, wherein the first rack includes a wire frame, and wherein the wire frame includes a plurality of wires that is bent.

12. The kit of claim 9,
wherein each of the plurality of handles on the first rack rotates about a transverse horizontal axis and wherein the first connector and the second connector each includes an elastic receptacle.

* * * * *